US009809196B1

(12) United States Patent
Penilla et al.

(10) Patent No.: US 9,809,196 B1
(45) Date of Patent: Nov. 7, 2017

(54) METHODS AND SYSTEMS FOR VEHICLE SECURITY AND REMOTE ACCESS AND SAFETY CONTROL INTERFACES AND NOTIFICATIONS

(71) Applicants: Angel A. Penilla, Sacramento, CA (US); Albert S. Penilla, Sunnyale, CA (US)

(72) Inventors: Angel A. Penilla, Sacramento, CA (US); Albert S. Penilla, Sunnyale, CA (US)

(73) Assignee: Emerging Automotive, LLC, Los Altos, CA (US)

( * ) Notice: Subject to any disclaimer, the term of this patent is extended or adjusted under 35 U.S.C. 154(b) by 906 days.

(21) Appl. No.: 13/911,072

(22) Filed: Jun. 5, 2013

Related U.S. Application Data

(63) Continuation-in-part of application No. 13/452,882, filed on Apr. 22, 2012, now Pat. No. 9,123,035.

(60) Provisional application No. 61/760,003, filed on Feb. 1, 2013, provisional application No. 61/745,729, filed on Dec. 24, 2012, provisional application No. 61/478,436, filed on Apr. 22, 2011.

(51) Int. Cl.
*B60R 25/10* (2013.01)
*B60R 25/30* (2013.01)
*H04N 7/18* (2006.01)

(52) U.S. Cl.
CPC .............. *B60R 25/10* (2013.01); *B60R 25/30* (2013.01); *H04N 7/181* (2013.01)

(58) Field of Classification Search
CPC ..... B60R 25/00; B60R 25/10; B60R 25/1004; B60R 25/102; B60R 25/30; B60R 25/302; B60R 25/305; B60R 2025/1016; B60R 2325/106; B60R 2325/205
See application file for complete search history.

(56) References Cited

U.S. PATENT DOCUMENTS

| | | |
|---|---|---|
| 3,690,397 A | 9/1972 | Parker |
| 3,799,063 A | 3/1974 | Reed |
| 3,867,682 A | 2/1975 | Ohya |
| 4,052,655 A | 10/1977 | Vizza |
| 4,102,273 A | 7/1978 | Merkle et al. |
| 4,132,174 A | 1/1979 | Ziegenfus et al. |
| 4,162,445 A | 7/1979 | Campbell |
| 4,309,644 A | 1/1982 | Reimers |
| 4,347,472 A | 8/1982 | Lemelson |
| 4,383,210 A | 5/1983 | Wilkinson |

(Continued)

*Primary Examiner* — Ryan Sherwin

(57) ABSTRACT

Methods, systems and media are provided for managing personal security of a user of a vehicle. The vehicle is provided with a plurality of active sensors. One method includes receiving a first remote request at the vehicle to activate a first level of security. The first level of security activates a first active sensor. The method includes recording an area proximate to vehicle in response to activating the first level of security. The recording produces a media file. The method includes transmitting the media file to Internet storage associated with an account of the user of the vehicle. The method includes setting indicators, such as lighting in and around the vehicle to identify a security level of the vehicle. The lighting can be color illumination, that indicates to a user before the user fully approaches the vehicle if the vehicle has a particular security level, based on prior monitored activity.

5 Claims, 16 Drawing Sheets

(56) References Cited

U.S. PATENT DOCUMENTS

| | | | |
|---|---|---|---|
| 4,389,608 A | 6/1983 | Dahl et al. |
| 4,405,891 A | 9/1983 | Galloway |
| 4,433,278 A | 2/1984 | Lowndes et al. |
| 4,450,400 A | 5/1984 | Gwyn |
| 4,532,418 A | 7/1985 | Meese |
| 4,789,047 A | 12/1988 | Knobloch |
| 4,815,840 A | 3/1989 | Benayad-Cherif et al. |
| 5,049,802 A | 9/1991 | Mintus et al. |
| 5,121,112 A | 6/1992 | Nakadozono |
| 5,132,666 A | 7/1992 | Fahs |
| 5,184,058 A | 2/1993 | Hesse |
| 5,202,617 A | 4/1993 | Nor |
| 5,297,664 A | 3/1994 | Tseng et al. |
| 5,306,999 A | 4/1994 | Hoffman |
| 5,315,227 A | 5/1994 | Pierson |
| 5,327,066 A | 7/1994 | Smith |
| 5,343,970 A | 9/1994 | Severinsky |
| 5,422,624 A | 6/1995 | Smith |
| 5,434,781 A | 7/1995 | Alofs |
| 5,441,122 A | 8/1995 | Yoshida |
| 5,449,995 A | 9/1995 | Kohchi |
| 5,487,002 A | 1/1996 | Diler et al. |
| 5,488,283 A | 1/1996 | Doughert et al. |
| 5,492,190 A | 2/1996 | Yoshida |
| 5,548,200 A | 8/1996 | Nor et al. |
| 5,549,443 A | 8/1996 | Hammerslag |
| 5,555,502 A | 9/1996 | Opel |
| 5,563,491 A | 10/1996 | Tseng |
| 5,585,205 A | 12/1996 | Kohchi |
| 5,594,318 A | 1/1997 | Knor et al. |
| 5,595,271 A | 1/1997 | Tseng |
| 5,596,258 A | 1/1997 | Kimura et al. |
| 5,612,606 A | 3/1997 | Guimarin et al. |
| 5,627,752 A | 5/1997 | Buck et al. |
| 5,636,145 A | 6/1997 | Gorman et al. |
| 5,642,270 A | 6/1997 | Green et al. |
| 5,666,102 A | 9/1997 | Lahiff |
| 5,691,695 A | 11/1997 | Lahiff |
| 5,694,019 A | 12/1997 | Uchida et al. |
| 5,701,706 A | 12/1997 | Kreysler et al. |
| 5,736,833 A | 4/1998 | Farris |
| 5,760,569 A | 6/1998 | Chase, Jr. |
| 5,778,326 A | 7/1998 | Moroto et al. |
| 5,790,976 A | 8/1998 | Boll et al. |
| 5,805,056 A * | 9/1998 | Mueller | B60R 25/1003 250/231.1 |
| 5,892,598 A | 4/1999 | Asakawa et al. |
| 5,916,285 A | 6/1999 | Alofs et al. |
| 5,974,136 A | 10/1999 | Murai |
| 5,998,963 A | 12/1999 | Aarseth |
| 6,014,597 A | 1/2000 | Kochanneck |
| 6,049,745 A | 4/2000 | Douglas et al. |
| 6,067,008 A | 5/2000 | Smith |
| 6,081,205 A | 6/2000 | Williams |
| 6,085,131 A | 7/2000 | Kim |
| 6,151,539 A | 11/2000 | Bergholz et al. |
| 6,175,789 B1 | 1/2001 | Beckert et al. |
| 6,225,776 B1 | 5/2001 | Chai |
| 6,234,932 B1 | 5/2001 | Kuroda et al. |
| 6,236,333 B1 | 5/2001 | King |
| 6,252,380 B1 | 6/2001 | Koenck |
| 6,294,989 B1 * | 9/2001 | Schofield | B60C 23/00 340/438 |
| 6,301,531 B1 | 10/2001 | Pierro |
| 6,307,349 B1 | 10/2001 | Koenck et al. |
| 6,330,497 B1 | 12/2001 | Obradovich et al. |
| 6,330,499 B1 | 12/2001 | Chou et al. |
| 6,370,475 B1 | 4/2002 | Breed et al. |
| 6,373,380 B1 | 4/2002 | Robertson et al. |
| 6,416,209 B1 | 7/2002 | Abbott |
| 6,434,465 B2 | 8/2002 | Schmitt et al. |
| 6,456,041 B1 | 9/2002 | Terada et al. |
| 6,466,658 B2 | 10/2002 | Schelberg, Jr. et al. |
| 6,480,767 B2 | 11/2002 | Yamaguchi |
| 6,487,477 B1 | 11/2002 | Woestman et al. |
| 6,498,454 B1 | 12/2002 | Pinlam |
| 6,511,192 B1 | 1/2003 | Henion |
| 6,586,866 B1 | 7/2003 | Ikedo |
| 6,614,204 B2 | 9/2003 | Pellegrino et al. |
| 6,629,024 B2 | 9/2003 | Tabata |
| 6,727,809 B1 | 4/2004 | Smith |
| 6,741,036 B1 | 5/2004 | Ikedo |
| 6,765,495 B1 | 7/2004 | Dunning et al. |
| 6,789,733 B2 | 9/2004 | Terranova et al. |
| 6,794,849 B2 | 9/2004 | Mori et al. |
| 6,850,898 B1 | 2/2005 | Murakami |
| 6,915,869 B2 | 7/2005 | Botti |
| 6,922,629 B2 | 7/2005 | Yoshikawa et al. |
| 6,937,140 B1 | 8/2005 | Outslay |
| 6,940,254 B2 | 9/2005 | Nagamine |
| 7,013,205 B1 | 3/2006 | Hafner |
| 7,039,389 B2 | 5/2006 | Johnson, Jr. |
| 7,084,781 B2 | 8/2006 | Chuey |
| 7,201,384 B2 | 4/2007 | Chaney |
| 7,269,416 B2 | 9/2007 | Guthrie et al. |
| 7,289,611 B2 | 10/2007 | Iggulden |
| 7,376,497 B2 | 5/2008 | Chen |
| 7,379,541 B2 | 5/2008 | Iggulden et al. |
| 7,402,978 B2 | 7/2008 | Pryor |
| 7,532,965 B2 | 5/2009 | Robillard |
| 7,565,396 B2 | 7/2009 | Hoshina |
| 7,630,802 B2 | 12/2009 | Breed |
| 7,650,210 B2 | 1/2010 | Breed |
| 7,674,536 B2 | 3/2010 | Chipchase |
| 7,683,771 B1 | 3/2010 | Loeb |
| 7,693,609 B2 | 4/2010 | Kressner et al. |
| 7,698,078 B2 | 4/2010 | Kelty et al. |
| 7,740,092 B2 | 6/2010 | Bender |
| 7,751,945 B2 | 7/2010 | Obata |
| 7,778,746 B2 | 8/2010 | McLeod |
| 7,796,052 B2 | 9/2010 | Katz |
| 7,850,351 B2 | 12/2010 | Pastrick et al. |
| 7,869,576 B1 | 1/2011 | Rodkey et al. |
| 7,885,893 B2 | 2/2011 | Alexander |
| 7,949,435 B2 | 5/2011 | Pollack |
| 7,956,570 B2 | 6/2011 | Lowenthal |
| 7,979,198 B1 | 7/2011 | Kim et al. |
| 7,986,126 B1 | 7/2011 | Bucci et al. |
| 7,991,665 B2 | 8/2011 | Hafner |
| 8,006,793 B2 | 8/2011 | Heichal et al. |
| 8,027,843 B2 | 9/2011 | Bodin et al. |
| 8,036,788 B2 | 10/2011 | Breed |
| 8,054,048 B2 | 11/2011 | Woody |
| 8,072,318 B2 | 12/2011 | Lynam |
| 8,103,391 B2 | 1/2012 | Ferro et al. |
| 8,256,553 B2 | 9/2012 | De Paschoal |
| 8,262,268 B2 | 9/2012 | Pastrick et al. |
| 8,265,816 B1 | 9/2012 | LaFrance |
| 8,266,075 B2 | 9/2012 | Ambrosio et al. |
| 8,294,420 B2 | 10/2012 | Kocher |
| 8,333,492 B2 | 12/2012 | Dingman et al. |
| 8,336,664 B2 | 12/2012 | Wallace et al. |
| 8,350,526 B2 | 1/2013 | Dyer et al. |
| 8,366,371 B2 | 2/2013 | Maniscalco et al. |
| 8,392,065 B2 | 3/2013 | Tolstedt |
| 8,405,347 B2 | 3/2013 | Gale |
| 8,451,331 B2 * | 5/2013 | Hughes | B60R 25/102 340/541 |
| 8,482,255 B2 | 7/2013 | Crombez |
| 8,483,775 B2 | 7/2013 | Buck et al. |
| 8,483,907 B2 | 7/2013 | Tarte |
| 8,490,005 B2 | 7/2013 | Tarte |
| 8,508,188 B2 | 8/2013 | Murtha et al. |
| 8,521,599 B2 | 8/2013 | Rivers, Jr. et al. |
| 8,527,135 B2 | 9/2013 | Lowrey et al. |
| 8,527,146 B1 | 9/2013 | Jackson |
| 8,552,686 B2 | 10/2013 | Jung |
| 8,589,019 B2 | 11/2013 | Wallace et al. |
| 8,624,719 B2 | 1/2014 | Klose |
| 8,630,741 B1 | 1/2014 | Matsuoka et al. |
| 8,635,091 B2 | 1/2014 | Amigo |
| 8,643,329 B2 | 2/2014 | Prosser et al. |
| 8,660,734 B2 | 2/2014 | Zhu et al. |
| 8,686,864 B2 | 4/2014 | Hannon |

(56) References Cited

U.S. PATENT DOCUMENTS

| | | |
|---|---|---|
| 8,694,328 B1 | 4/2014 | Gormley |
| 8,706,394 B2 | 4/2014 | Trepagnier et al. |
| 8,713,121 B1 | 4/2014 | Bain |
| 8,717,170 B1 | 5/2014 | Juhasz |
| 8,725,551 B2 | 5/2014 | Ambrosio et al. |
| 8,751,065 B1 | 6/2014 | Kato |
| 8,751,271 B2 | 6/2014 | Stefik et al. |
| 8,760,432 B2 | 6/2014 | Jira et al. |
| 8,799,037 B2 | 8/2014 | Stefik et al. |
| 8,816,845 B2 | 8/2014 | Hoover et al. |
| 8,818,622 B2 | 8/2014 | Bergholz et al. |
| 8,818,725 B2 | 8/2014 | Ricci |
| 8,819,414 B2 | 8/2014 | Bellur et al. |
| 8,825,222 B2 | 9/2014 | Namburu et al. |
| 8,836,281 B2 | 9/2014 | Ambrosio et al. |
| 8,836,784 B2 * | 9/2014 | Erhardt ............... B60R 25/102 348/148 |
| 8,970,699 B2 * | 3/2015 | Xiao ................... B60R 25/305 348/143 |
| 2002/0064258 A1 | 5/2002 | Schelberg et al. |
| 2002/0085043 A1 | 7/2002 | Ribak |
| 2002/0133273 A1 | 9/2002 | Lowrey et al. |
| 2003/0137277 A1 | 7/2003 | Mori et al. |
| 2003/0153278 A1 | 8/2003 | Johnson |
| 2003/0205619 A1 | 11/2003 | Terranova et al. |
| 2003/0234325 A1 | 12/2003 | Marino et al. |
| 2004/0046506 A1 | 3/2004 | Mawai et al. |
| 2004/0064235 A1 | 4/2004 | Cole |
| 2004/0092253 A1 | 5/2004 | Simonds et al. |
| 2004/0093155 A1 | 5/2004 | Simonds et al. |
| 2004/0265671 A1 | 12/2004 | Chipchase et al. |
| 2005/0021190 A1 | 1/2005 | Worrell et al. |
| 2005/0044245 A1 | 2/2005 | Hoshina |
| 2005/0231119 A1 | 10/2005 | Ito et al. |
| 2006/0125620 A1 | 6/2006 | Smith et al. |
| 2006/0132294 A1 * | 6/2006 | Spark ................. B60R 25/1003 340/426.1 |
| 2006/0182241 A1 | 8/2006 | Schelberg et al. |
| 2006/0250501 A1 * | 11/2006 | Widmann ........... B60R 25/1004 348/148 |
| 2006/0282381 A1 | 12/2006 | Ritchie |
| 2006/0287783 A1 | 12/2006 | Walker |
| 2007/0068714 A1 | 3/2007 | Bender |
| 2007/0126395 A1 | 6/2007 | Suchar |
| 2007/0282495 A1 | 12/2007 | Kempton |
| 2008/0039979 A1 | 2/2008 | Bridges et al. |
| 2008/0039989 A1 | 2/2008 | Pollack et al. |
| 2008/0040129 A1 | 2/2008 | Cauwels et al. |
| 2008/0040223 A1 | 2/2008 | Bridges et al. |
| 2008/0040295 A1 | 2/2008 | Kaplan et al. |
| 2008/0052145 A1 | 2/2008 | Kaplan et al. |
| 2008/0086411 A1 | 4/2008 | Olson et al. |
| 2008/0097904 A1 | 4/2008 | Volchek |
| 2008/0155008 A1 | 6/2008 | Stiles et al. |
| 2008/0180027 A1 | 7/2008 | Matsushita et al. |
| 2008/0203973 A1 | 8/2008 | Gale et al. |
| 2008/0204556 A1 * | 8/2008 | de Miranda ......... B60R 25/102 348/148 |
| 2008/0228613 A1 | 9/2008 | Alexander |
| 2008/0281663 A1 | 11/2008 | Hakim |
| 2008/0294283 A1 | 11/2008 | Ligrano |
| 2008/0312782 A1 | 12/2008 | Berdichevsky |
| 2009/0011639 A1 | 1/2009 | Ballard et al. |
| 2009/0021213 A1 | 1/2009 | Johnson |
| 2009/0021385 A1 | 1/2009 | Kelty et al. |
| 2009/0030712 A1 | 1/2009 | Bogolea |
| 2009/0043519 A1 | 2/2009 | Bridges et al. |
| 2009/0058355 A1 | 3/2009 | Meyer |
| 2009/0066287 A1 | 3/2009 | Pollack et al. |
| 2009/0076913 A1 | 3/2009 | Morgan |
| 2009/0082957 A1 | 3/2009 | Agassi et al. |
| 2009/0091291 A1 | 4/2009 | Woody et al. |
| 2009/0092864 A1 | 4/2009 | McLean |
| 2009/0144001 A1 | 6/2009 | Leonard et al. |
| 2009/0157289 A1 | 6/2009 | Graessley |
| 2009/0164473 A1 | 6/2009 | Bauer |
| 2009/0174365 A1 | 7/2009 | Lowenthal et al. |
| 2009/0177580 A1 | 7/2009 | Lowenthal et al. |
| 2009/0210357 A1 | 8/2009 | Pudar et al. |
| 2009/0273941 A1 * | 11/2009 | Englander ............... B60Q 1/24 362/464 |
| 2009/0287578 A1 | 11/2009 | Paluszek |
| 2009/0312903 A1 | 12/2009 | Hafner et al. |
| 2009/0312945 A1 * | 12/2009 | Sakamoto .......... G01C 21/3691 701/532 |
| 2009/0313032 A1 | 12/2009 | Hafner et al. |
| 2009/0313033 A1 | 12/2009 | Hafner et al. |
| 2009/0313034 A1 | 12/2009 | Ferro et al. |
| 2009/0313098 A1 | 12/2009 | Hafner et al. |
| 2009/0313104 A1 | 12/2009 | Hafner et al. |
| 2009/0313174 A1 | 12/2009 | Hafner et al. |
| 2010/0013434 A1 | 1/2010 | Taylor-Haw et al. |
| 2010/0017045 A1 | 1/2010 | Nesler et al. |
| 2010/0017249 A1 | 1/2010 | Fincham et al. |
| 2010/0049396 A1 | 2/2010 | Ferro et al. |
| 2010/0049533 A1 | 2/2010 | Ferro et al. |
| 2010/0049610 A1 | 2/2010 | Ambrosio et al. |
| 2010/0049639 A1 | 2/2010 | Ferro et al. |
| 2010/0049737 A1 | 2/2010 | Ambrosio et al. |
| 2010/0057306 A1 | 3/2010 | Ishii et al. |
| 2010/0112843 A1 | 5/2010 | Heichal et al. |
| 2010/0141206 A1 | 6/2010 | Agassi et al. |
| 2010/0161481 A1 | 6/2010 | Littrell |
| 2010/0161482 A1 | 6/2010 | Littrell |
| 2010/0169008 A1 | 7/2010 | Niwa et al. |
| 2010/0198508 A1 | 8/2010 | Tang |
| 2010/0198513 A1 | 8/2010 | Zeng |
| 2010/0211340 A1 | 8/2010 | Lowenthal et al. |
| 2010/0211643 A1 | 8/2010 | Lowenthal et al. |
| 2010/0222939 A1 | 9/2010 | Namburu |
| 2010/0268426 A1 | 10/2010 | Pathak |
| 2010/0280956 A1 | 11/2010 | Chutorash et al. |
| 2010/0304349 A1 | 12/2010 | Kunin |
| 2011/0032211 A1 | 2/2011 | Taguchi |
| 2011/0068910 A1 * | 3/2011 | Iwai ..................... B60Q 1/085 340/435 |
| 2011/0074350 A1 | 3/2011 | Kocher |
| 2011/0074351 A1 | 3/2011 | Bianco et al. |
| 2011/0077809 A1 | 3/2011 | Leary |
| 2011/0106329 A1 | 5/2011 | Donnelly et al. |
| 2011/0112969 A1 | 5/2011 | Zaid et al. |
| 2011/0130885 A1 | 6/2011 | Bowen et al. |
| 2011/0187521 A1 | 8/2011 | Beruscha et al. |
| 2011/0191265 A1 | 8/2011 | Lowenthal et al. |
| 2011/0193522 A1 | 8/2011 | Uesugi |
| 2011/0202218 A1 | 8/2011 | Yano |
| 2011/0246252 A1 | 10/2011 | Uesugi |
| 2011/0279083 A1 | 11/2011 | Asai |
| 2011/0309929 A1 | 12/2011 | Myers |
| 2012/0013300 A1 | 1/2012 | Prosser et al. |
| 2012/0019204 A1 | 1/2012 | Matsuo |
| 2012/0025765 A1 | 2/2012 | Frey et al. |
| 2012/0028680 A1 | 2/2012 | Breed |
| 2012/0041624 A1 | 2/2012 | Stewart et al. |
| 2012/0053754 A1 | 3/2012 | Pease |
| 2012/0074903 A1 | 3/2012 | Nakashima |
| 2012/0105197 A1 | 5/2012 | Kobres |
| 2012/0123670 A1 | 5/2012 | Uyeki |
| 2012/0136743 A1 | 5/2012 | McQuade et al. |
| 2012/0136802 A1 | 5/2012 | McQuade et al. |
| 2012/0158244 A1 | 6/2012 | Talty et al. |
| 2012/0179323 A1 | 7/2012 | Profitt-Brown et al. |
| 2012/0218128 A1 | 8/2012 | Tieman et al. |
| 2012/0229056 A1 | 9/2012 | Bergfjord |
| 2012/0229085 A1 | 9/2012 | Lau |
| 2012/0232965 A1 | 9/2012 | Rodriguez et al. |
| 2012/0233077 A1 | 9/2012 | Tate et al. |
| 2012/0262002 A1 | 10/2012 | Widmer et al. |
| 2012/0268068 A1 | 10/2012 | Jung et al. |
| 2012/0268076 A1 | 10/2012 | Danner |
| 2012/0268242 A1 | 10/2012 | Tieman et al. |
| 2012/0280654 A1 | 11/2012 | Kim |
| 2012/0296512 A1 | 11/2012 | Lee et al. |

(56) References Cited

U.S. PATENT DOCUMENTS

| | | |
|---|---|---|
| 2012/0303397 A1 | 11/2012 | Prosser |
| 2012/0306445 A1 | 12/2012 | Park et al. |
| 2012/0310713 A1 | 12/2012 | Mercuri et al. |
| 2012/0316671 A1 | 12/2012 | Hammerslag et al. |
| 2013/0002876 A1 | 1/2013 | Pastrick et al. |
| 2013/0020139 A1 | 1/2013 | Kim et al. |
| 2013/0021162 A1 | 1/2013 | DeBoer et al. |
| 2013/0037339 A1 | 2/2013 | Hickox |
| 2013/0099892 A1 | 4/2013 | Trucker et al. |
| 2013/0103236 A1 | 4/2013 | Mehrgan |
| 2013/0110296 A1 | 5/2013 | Khoo et al. |
| 2013/0110632 A1 | 5/2013 | Theurer et al. |
| 2013/0110653 A1 | 5/2013 | Rivers et al. |
| 2013/0127247 A1 | 5/2013 | Oh et al. |
| 2013/0135093 A1 | 5/2013 | Araki |
| 2013/0144520 A1 | 6/2013 | Ricci |
| 2013/0145065 A1 | 6/2013 | Ricci |
| 2013/0179057 A1 | 7/2013 | Fisher et al. |
| 2013/0204466 A1 | 8/2013 | Ricci |
| 2013/0241720 A1 | 9/2013 | Ricci et al. |
| 2013/0253746 A1 | 9/2013 | Choi et al. |
| 2013/0280018 A1 | 10/2013 | Meirer et al. |
| 2013/0300554 A1 | 11/2013 | Braden |
| 2013/0317693 A1 | 11/2013 | Jefferies et al. |
| 2013/0317694 A1 | 11/2013 | Merg et al. |
| 2013/0328387 A1 | 12/2013 | Venkateswaran |
| 2013/0338820 A1 | 12/2013 | Corbett et al. |
| 2013/0342363 A1 | 12/2013 | Paek et al. |
| 2014/0002015 A1 | 1/2014 | Tripathi et al. |
| 2014/0019280 A1 | 1/2014 | Medeiros et al. |
| 2014/0021908 A1 | 1/2014 | McCool |
| 2014/0042968 A1 | 2/2014 | Hiroe |
| 2014/0047107 A1 | 2/2014 | Maturana et al. |
| 2014/0066049 A1 | 3/2014 | Cho et al. |
| 2014/0089016 A1 | 3/2014 | Smullin et al. |
| 2014/0106726 A1 | 4/2014 | Crosbie |
| 2014/0118107 A1 | 5/2014 | Almomani |
| 2014/0120829 A1 | 5/2014 | Bhamidipati et al. |
| 2014/0125355 A1 | 5/2014 | Grant |
| 2014/0142783 A1 | 5/2014 | Grimm et al. |
| 2014/0163771 A1 | 6/2014 | Demeniuk |
| 2014/0163774 A1 | 6/2014 | Demeniuk |
| 2014/0164559 A1 | 6/2014 | Demeniuk |
| 2014/0172192 A1 | 6/2014 | Kato |
| 2014/0172265 A1 | 6/2014 | Funabashi |
| 2014/0172727 A1 | 6/2014 | Abhyanker et al. |
| 2014/0179353 A1 | 6/2014 | Simon |
| 2014/0200742 A1 | 7/2014 | Mauti et al. |
| 2014/0203077 A1 | 7/2014 | Gadh et al. |
| 2014/0207333 A1 | 7/2014 | Vandivier et al. |
| 2014/0214261 A1 | 7/2014 | Ramamoorthy et al. |
| 2014/0214321 A1 | 7/2014 | Kawamata et al. |
| 2014/0218189 A1 | 8/2014 | Fleming et al. |
| 2014/0232331 A1 | 8/2014 | Stamenic et al. |
| 2014/0236414 A1 | 8/2014 | Droz et al. |
| 2014/0236463 A1 | 8/2014 | Zhang et al. |
| 2014/0253018 A1 | 9/2014 | Kong et al. |
| 2014/0277936 A1 | 9/2014 | El Dokor et al. |
| 2014/0278089 A1 | 9/2014 | Gusikhin et al. |
| 2014/0300739 A1 | 10/2014 | Mimar |

\* cited by examiner

METHODS AND SYSTEMS FOR VEHICLE SECURITY AND REMOTE ACCESS AND SAFETY CONTROL INTERFACES AND NOTIFICATIONS

CLAIM OF PRIORITY

The present application claims priority from U.S. Provisional Patent Application No. 61/760,003, filed on Feb. 1, 2013, and entitled "METHODS AND SYSTEMS FOR VEHICLE SECURITY AND REMOTE ACCESS AND SAFETY CONTROL INTERFACES AND NOTIFICATIONS", which is herein incorporated by reference.

The present invention claims priority to U.S. Provisional Patent Application No. 61/745,729, filed on Dec. 24, 2012, and entitled "METHODS AND SYSTEMS FOR ELECTRIC VEHICLE (EV) CHARGING, CHARGING SYSTEMS, INTERNET APPLICATIONS AND USER NOTIFICATIONS", which is herein incorporated by reference.

This Application is also a continuation-in-part of U.S. application Ser. No. 13/452,882, filed Apr. 22, 2012, and entitled "ELECTRIC VEHICLE (EV) RANGE EXTENDING CHARGE SYSTEMS, DISTRIBUTED NETWORKS OF CHARGE KIOSKS, AND CHARGE LOCATING MOBILE APPS", which claims priority to U.S. Provisional Application No. 61/478,436, filed on Apr. 22, 2011, all of which are incorporated herein by reference.

FIELD OF THE EMBODIMENTS

The present invention relates to systems and methods for vehicle security, and exchange of information with cloud-based processing systems to enable vehicle security features.

BACKGROUND

Vehicles, such as motorized vehicles and electric vehicles have been around for some time. Vehicles provide a means that enable humans to drive from place to place. In today's world, vehicles have become an indispensable mode of transportation, and provide the freedom to travel at any time of day and for various distances. Vehicles can be publically operated or can be privately owned. Humans most commonly operate vehicles, no matter the type, whether electric or combustion engine based. In recent years, technology has been advancing to allow for better wireless interfacing and networking with vehicles. Such wireless interfacing has included, for example, integrated alarms and remote lock and unlock by way of key fobs. These features, although representing advancements in security, still do not provide vehicle drivers with the level of security needed in today's society.

It is in this context that embodiments of the invention arise.

SUMMARY

In one embodiment, a method for managing personal security of a user of a vehicle is provided. The vehicle has a plurality of active sensors. The method includes receiving a first remote request at the vehicle to activate a first level of security, the first level of security activating a first active sensor. The method includes recording an area proximate to vehicle in response to activating the first level of security, the recording producing a media file. The method includes transmitting the media file to Internet storage associated with an account of the user of the vehicle.

In some embodiments, the method further includes, receiving a second remote request at the vehicle to activate a second level of security, the second level of security activating a second active sensor, the second active sensor is more alarm intensive than the first active sensor.

In some embodiments, the second level of security triggers a notification to predefined authorities, the notification including at least part of the media file.

In some embodiments, the active sensors include, one or more of a first type of sensors that collect data; and one or more of a second type of sensors that produce actions, wherein the actions including turning on lights, controlling vehicle components, controlling recording of audio or video, flashing lights, providing audible responses, sounding alarms, sounding voice messages, or combinations thereof.

In some embodiments, the method further includes, transmitting a notification to a predefined destination regarding the first remote request, wherein the transmitting of the notification is saved to history in the account of the user at the internet storage, such that access to the Internet storage is provided to the user via the account to view or share data regarding the notification.

In some embodiments, the method further includes, sending a notification to the user upon activating the first level of security, the notification including data indicative of a danger condition, the danger condition determined based monitored conditions proximate to the vehicle and rules that define which ones of the monitored conditions should be considered danger conditions.

In some embodiments, the notification is sent to a mobile device of the user that identifies the danger condition, a key fob for the vehicle, a predefined security agent, police, or a combination thereof.

In some embodiments, the media file is one of video, audio, image, sounds and images, video clips, infrared images, sound waves, impact data, or combinations thereof that can be stored in digital form.

In another embodiment, a method of managing security of a vehicle having electronics for managing the vehicle and for communicating wirelessly with the Internet is provided. The method includes receiving one or more requests at the vehicle from a wireless device handled by a user of the vehicle, wherein each one of successive requests triggers a heightened level of security. The method includes initiating video recording proximate to the vehicle upon receiving one of the requests. The method includes transmitting, over the internet, a notification to a predetermined recipient concerning the one more requests received at the vehicle, the notification including at least part of the video recording. The notification and the last least part of the video recording is saved at a remote server, connected to the internet, associated with an account of the user for the vehicle.

In some embodiments, the account of the user for the vehicle is accessed at a website or application and the account identifies a history of events that include saved notifications and access to the video recordings associated with the notifications.

In some embodiments, the wireless device is a key fob having at least one button, wherein at least one of the buttons is selected one or more times to cause the one or more requests that are received by the vehicle.

In some embodiments, the wireless device is a portable computing device having one or more selection options, wherein at least one of the selection options is selected one or more times to cause the one or more requests that are received by the vehicle.

In some embodiments, the notification is correlated to a geographic location of the vehicle.

In some embodiments, the notification for the vehicle is added to a history database for the geographic location, notification history database including notifications from a plurality of vehicles that generate notifications over time, further comprising, generating safety grades, at a server connected to the Internet, and assigning the safety grades to a plurality of geographic locations based on past occurrences of notifications at or near the plurality of geographic locations.

In some embodiments, the method further includes, presenting the safety grades, upon request, to devices requesting safety history for a geographic location.

In another embodiment, a method for managing security of a vehicle having electronics for managing the vehicle and for communicating wirelessly with the Internet is disclosed. The method includes receiving one or more requests at the vehicle from a wireless device handled by a user of the vehicle. The method includes illuminating an area proximate to the vehicle with lighting upon receiving a first request, the illuminating being color coded to be indicative of a safety level associated with the vehicle based on events that were detected at the vehicle or proximate to the vehicle during a time before receiving the one or more requests at the vehicle, the one or more requests include a request to open or access the vehicle, the method being executed by a processor.

In some embodiments, the method further includes, initiating video recording proximate to the vehicle upon receiving one of the requests; transmitting, over the internet, a notification to a predetermined recipient concerning the one more requests received at the vehicle, the notification including at least part of the video recording; and wherein the notification and the last least part of the video recording is saved at a remote server, connected to the internet, associated with an account of the user for the vehicle.

In some embodiments, the method further includes, providing a changed lighting after receiving a second request, the changed lighting is intensified lighting or different color lighting.

In some embodiments, a second requests triggers elevated audible outputs from the vehicle, the audio outputs include sounds and/or voice language warnings.

In some embodiments, the illuminated area proximate to the vehicle is viable from a distance to notify safety level, wherein a different color defines a different predefined safety level.

DETAILED EMBODIMENTS

Figure 1:
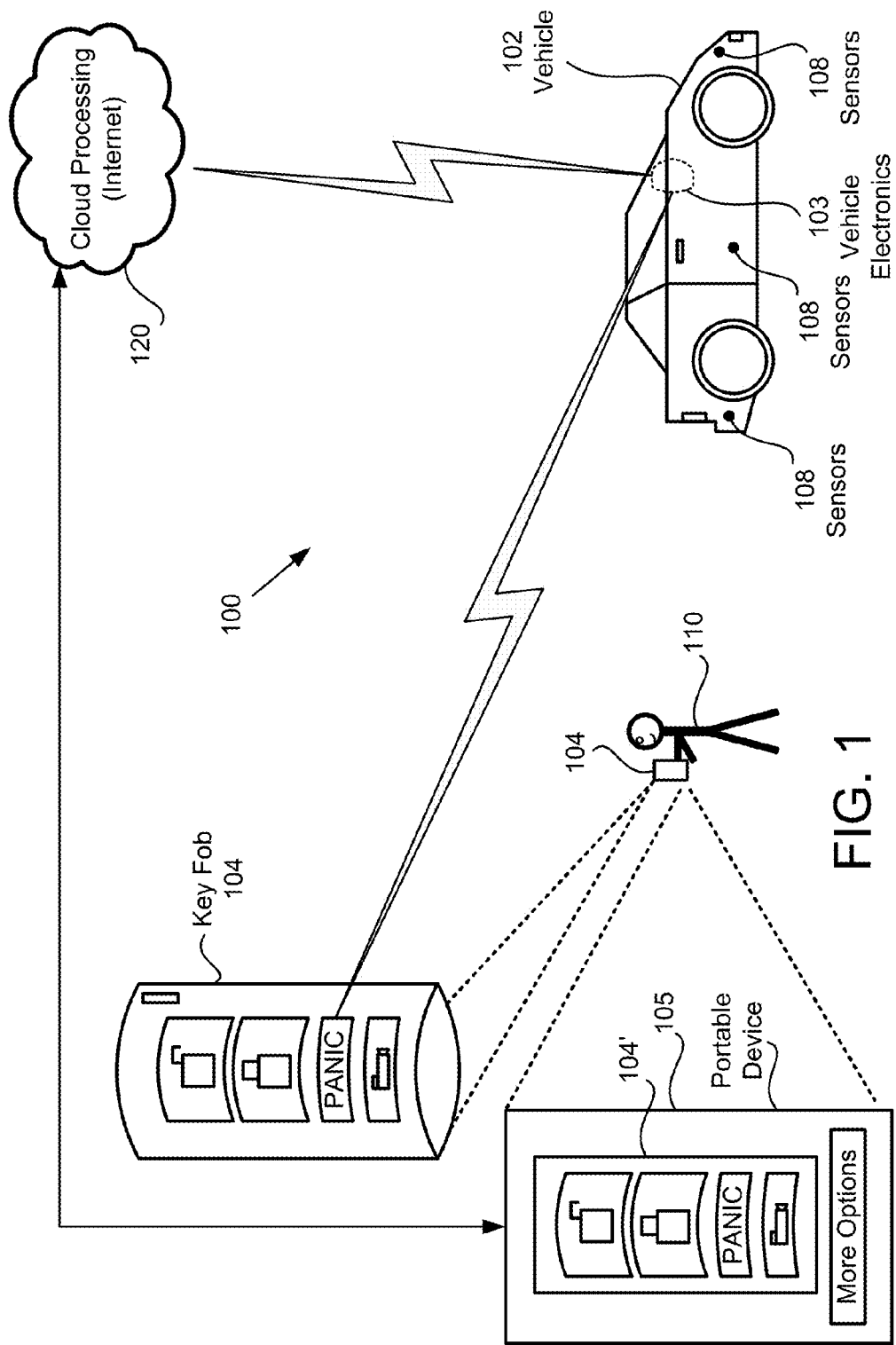
FIG. 1 illustrates a general example diagram of a user operating a key fob or a portable device, to communicate with a vehicle, in accordance with one embodiment of the present invention.

A number of embodiments are described below, with reference to specific implementations that refer to vehicles, but such implementations should be broadly construed to include any type of vehicle, structure or object. Without limitation, vehicles can include any type of moving object that can be steered, and can include vehicles that are for human occupancy or not. Vehicles can include those that are privately owned, owned by corporations, commercially operated vehicles, such as buses, automobiles, trucks, cars, buses, trains, trolleys, etc. Example vehicles can include those that are combustion engine based, electric engine (EV) based, hybrids, or other types of energy source vehicles.

The embodiments of the present invention relate to vehicle security and/or vehicle personal security, and methods for managing remote control of security functions and remote access and control from a remote location over the Internet. At the remote location, a user is able to access a user interface for an application, which provides users access to their user accounts. A user account can be for a user and the user can add one or more vehicles, objects, data or appliances for remote reporting, viewing and control. In one embodiment, a user is an owner or user of a vehicle. The user can register the vehicle with a remote service.

The remote service can be accessed over the Internet, such as via a website or application of a portable device. The remote service can provide a multitude of cloud services for the user, such as remote control features, remote viewing services, remote alarm controls, remote camera activation, remote audio/video recording of the vehicle (i.e., areas around the vehicle and inside the vehicle). In one embodiment, the vehicle is able to connect to the Internet (e.g., when the vehicle engine is off, on, and/or is occupied or un-occupied) to allow a user, via a remote cloud service, to access features of the vehicle. The vehicle can be accessed when running, when parked, when stopped, when moving, etc. The vehicle and its audio recording devices and video cameras can be accessed from remote locations, to allow users to remotely communicate with the vehicle or with people riding or residing inside the vehicle.

The remote communication can also allow a person to communicate remotely with people standing outside (or inside) of a vehicle. For instance, if a user is accessing his or her vehicle from a remote location, cameras installed in and/or on the vehicle allow the remote user to see a person standing proximate to the vehicle. The remote user can then communicate with a person standing proximate to the vehicle using microphones and speakers of the vehicle.

In one embodiment, the user or owner of the vehicle can get a notification from the vehicle if the vehicle detects a person standing proximate to the vehicle or taking some action that is not consistent with passive standing. For instance, if a person is trying to gain unauthorized entry into the vehicle, the vehicle can send a notification to the owner and the owner can view the activity remotely and can also speak to the person attempting to break in or who has broken in to the vehicle. The same notification can be sent to authorities, such as the police. This notification can contain audio, video, location, date stamp and other metrics associated with the incident. This notification can be sent automatically or initiated remotely by a vehicle's user/owner to alert authorities after the user/owner has determined that the activity is in fact a crime and not a false alarm.

In the following examples, additional security features are also described which are relevant and pertain to preventative security tools. The security tools can include, for instance, allowing a user to select a button or input, which remotely lights the vehicle up before or as the user walks to the vehicle. This feature is useful, for instance, when a user needs to get to his or her car in a parking garage or location that may not be safe. For instance, if a user needs to collect his or her car from a parking spot at night, the user may not feel very comfortable going to his or her car, with fear of being car jacked.

The user, in one embodiment, can select a button that lights up his or her car from remote location. In one embodiment, the button can be thought of as a personal security escort service, which provides the driver approaching the vehicle with added security.

In one embodiment, the button can also act to begin recording of activity proximate to the vehicle. The recording can be saved to storage of the vehicle and can also be streamed to the user's cloud services account. Each time the user selects to use the security feature and recording begins and a history log can be saved. If an incident were to occur, the user can click or push a second button remotely that causes immediate notification to authorities or police. In this embodiment, the area around the vehicle is also recorded with cameras, microphones, motion sensors, etc.

Other sensors can be integrated into the vehicle, such as motion sensors, heat sensors, multiple cameras, etc. These sensors can provide triggers to code executed on vehicle hardware and/or cloud hardware, to initiate one or more alarms or take proactive security actions and/or send notifications to users of the vehicles and/or authorities.

If the user arrives at the vehicle and no incident occurs, the user can elect whether to keep or discard the recorded data. In one embodiment, each time a recording occurs, the history data can also save information regarding the time of alerts, location coordinates of the events (GPS data), etc. This data can also be saved and processed by cloud processing programs to collect data over time of vehicles having this communication/security feature.

Heat maps of prior activity can also be defined for later use. In one embodiment, the data used to construct the heat map of prior activity may be crowd-sourced in that data from events from all prior individual users is amalgamated into trends and probability of incident. In this manner, if a user wishes to see the historical data of a parking area or location, the user can see or determine how safe the location might be. Using this data, the user can determine when the safest time of day or the safest day of the week is to park at a certain location.

In one embodiment, the data regarding historical events can be provided to users on a display of a vehicle, smartphone or computer with Internet/Cloud access, and the data can be provided in various levels of granularity. For instance, the data can be provided with a simple grade, such as A for safe, B for relatively safe, F for not safe, etc. If the user wishes more detailed information, the user can be provided with information regarding past actual events. People wishing more security can therefore select a better location to park. In one embodiment, a same parking garage can have different grade levels for different areas or for different parking slots. Information regarding localized incidents within parking garages, parking lots, street parallel parking, shopping centers, airports, service stations etc. can also be used by parking garage operators, police, business owners and or service attendants or the like to improve security as they will have access to granular incident data and heat maps.

In another embodiment, a vehicle's A/V recording systems may be triggered to record video and audio at certain predetermined times, as programmed by the user. The user can program the vehicle to record upon a panic button press, upon a break-in condition, or upon any type of trigger condition. The event can then be transmitted to a cloud storage system to enable the user to view data about the condition. All or part of the data can be provided to predetermined entities, such as police, local security, etc.

The data can be viewed via any computer or mobile device having access to the internet. In one embodiment, the vehicle can be continuously recording A/V data in a buffer, e.g., circular or non-circular buffer (e.g., storage that is local on the vehicle or storage that is part of a cloud based data center or centers). The data may be discarded after a buffer period of time. If a trigger condition occurs, the trigger condition can capture a buffer period of time before the trigger and a period of time after the trigger. These updates can be programmed to be auto-sent to recipient, and can be provided as notifications to smartphone devices.

In one embodiment, structures described herein can include parking structures, parking lots, private or commercial buildings, drive-through, bridges, toll roads, highways, shared or home driveways, designated driving and parking areas. In the specific embodiments described herein, vehicles, structures and objects may include circuitry and communication logic to enable communication with a cloud processing system over the Internet. A cloud processing system, as described herein, will include systems that are operated and connected to the Internet or to each other using local networking communication protocols.

A cloud processing system can be defined as an interconnected and distributed physical or virtual software defined network that utilizes virtual or physical processing and storage machines that enable various applications and operating systems to facilitate the communication with and between various client devices (vehicles, user devices, structures, objects etc.). The communication with and between the various client devices will enable the cloud processing system to deliver additional processing information, data, and real-time metrics concerning data obtained from other processing systems as well as client feedback data. The distributed nature of the cloud processing system will enable users of various vehicles, structures and objects to access the Internet, and be presented with more flexible processing power that will provide the requested services in a more effective manner.

The processing systems can be defined from various data centers that include multiple computing systems that provide the processing power to execute one or more computer readable programs. The processing of the computer readable programs can produce operations that can respond to requests made by other processing systems that may be local to a vehicle's electronic system. For example, a vehicle can include electronics that utilize memory and a processor to execute program instructions to provide services.

In one embodiment, the services provided by the electronic systems of a vehicle can include services that access the various components or subsystems of a vehicle, such as door locks, service histories, user profiles, audio settings, entertainment settings, mapping functions, communications systems, telecommunication synchronization systems, speakers, heating and cooling functions, auto-engine start/shut-off remotely via smart devices, remote heating/cooling initiation, remote face-to-face conferencing, etc. The electronic systems within a vehicle can also provide a user interface, such as a graphical user interface. The graphical user interface can include a plurality of buttons, controls and transceivers to receive input from a user. The input from a user can also be provided by voice input, facial recognition, eye-retina scans, fingerprint scans, a combination of biometrics, or via a capacitive or regular touchscreen contained or displayed within the vehicle, the vehicle's glass, doors, dashboard etc.

In other embodiments, the electronics of a vehicle can synchronize with a user's portable electronics. The user's electronics can include, for example mobile devices that include smart phones, tablet computers, laptop computers, general-purpose computers, special purpose computers, etc. The various computing devices of the vehicle, and or the computing devices of the user (smart devices) can be connected to the Internet or to each other. Provided that a user has access or account access to the cloud service, the cloud processing services on the Internet can provide additional processing information to the electronics of the vehicle.

In the following embodiments, examples will be provided for ways of having the cloud processing services deliver processing information concerning various physical locations that have mapping data associated there with. The following embodiments will also provide examples of ways a cloud processing service, together with physical sensors, can allow vehicles, structures and objects to become aware of each other, share locations, measurements and mapping data, intended paths and other metrics along with remote administration of the same.

The mapping data associated with the various locations can include locations of objects in the real world. The objects in the real world can include roads, sidewalks, buildings, barriers, fencing, parking structures, walls or obstacles within a location, doors, positioning of walls, location information of other vehicles within a location, sensor data associated with various locations, mapping data that outlines the geometries of a building or vehicle, sensor location that is static and/or dynamic, area and volume information within buildings, structures or areas, sensors for detecting movement or presence of obstacles within a location, data identifying occupancy a specific locations such as a parking structure, a parking space, etc.

In one embodiment, the sensors of a building, showing the outline of the building can provide data of what spaces are available within a designated parking area for example. When a vehicle reaches a building, parking lot, parking designated area of ad-hoc parking lot where auto-park is available, the vehicle will become aware of the availability of non-human operated auto parking and will transfer and receive information to and from the cloud to download and/or access the building's location and map of sensors. When a vehicle reaches a different auto-park location, it will download that particular map.

In one embodiment, vehicles can maintain information regarding where they are, where they are heading and their destination maintained which is maintained by GPS and navigation systems on board. The information collected and maintained by every vehicle is mutually exclusive, meaning that only each individual vehicle is aware of its own heading, rate of speed and current location. This information, on one embodiment is crowd sourced and crowd shared/consumed for use in for accident avoidance. By networking vehicles within a certain radius together, all individually location-aware vehicles become aware of all other vehicles in their sphere of influence. Every vehicle will network with vehicles in their range using wireless communication systems such as but not limited to Wi-Fi, Wi-Gig LTE, cellular, radio, near field communication or other methods.

In one embodiment, each vehicle may maintain a table (e.g., in storage, locally on in cloud storage) of all other vehicles in, entering, and or leaving its sphere of influence. The vehicle's cameras can be engaged to take still photos and or video record any incident, whether it results in a successful avoidance or impact. This footage can be used to alert authorities of the severity of the accident and aid insurance companies in identifying fault. A vehicle will maintain a buffer of events for a given amount of time before and after a collision event or collision avoidance event such as the location, speed, heading, and avoidance measures to store and identify the metrics that lead to an incident.

In one embodiment, a personal security system for a vehicle can include a number of features. One feature is electronics in the vehicle that can communicate with sensors of the vehicle and can communicate with the Internet for accessing cloud processing services and storage. The communication system for the vehicle can include, for instance, cellular communication with cell towers, WiFi, WiGig, 802.11ac, 802.11ad and consequent wireless networking standards and technology for communication with wireless routers, peer-to-peer communication with other vehicles or connected computers, near field communication, Bluetooth communication, satellite communication, radio communication, infrared communication, or combinations thereof.

In one embodiment, the communications of the vehicle and electronics of the vehicle will enable direct communication with a user of the vehicle. The user of the vehicle can include, for instance, the owner of the vehicle, a driver of the vehicle, or any third party having access to the vehicle (either to drive the vehicle, to monitor the vehicle remotely, etc.)

In one embodiment, the user can communicate security instructions to the vehicle using a key radio frequency emitting or network connected fob, mobile device, or the like. The key fob, for instance, may include a button to signal to the vehicle that a user wishes to activate a security protocol before, during or after the vehicle is accessed. The button can, in one embodiment, be a button that is in addition to a panic button. While a panic button can only provide on/off signals to the car (e.g., to sound alarms and lights), the additional button can be used to communicate more than on/off signals. Still further, the additional button can be the same button as an existing panic button. For instance, if the panic button is pushed once, that could mean that the user wishes a lower level of preventative security.

For example, vehicle preventative security can include: (a) turning on lights around the vehicle to make it safe for the user to approach (e.g., when the vehicle is parked in poorly lit place), (b) sounding a low level audio signal (less dramatic than a panic alarm); (c) providing voice and/or audio notification to the surrounding area noting that the vehicle is being monitored (e.g., "this vehicle is being monitored for security . . . you may be recorded during this time"); (d) turning on a recording light on the vehicle, which notifies people that the area is being recorded and actively viewed; (e) a combination of lighting, sound or audio notifications, and recording of the space around the vehicle as the user approaches can also be included as example preventative security. As noted, the preceding examples may be remotely triggered by a user, e.g., using a key fob or via a computer or mobile device connected to the Internet via an application or web browser.

In one embodiment, a key fob can allow a user to click once for a lower level of preventative security to be activated and if no incident occurs, the user once in the vehicle and in safety can select to erase the recorded images or data. The vehicle can also provide a query on the display screen asking the user to confirm if the event should be maintained (e.g., saved on vehicle storage or saved to cloud storage) or erased. On the other hand, a user can double click the security button or elect a separate button if the user determines that more security is needed while approaching the vehicle. If the user feels that danger is likely to occur, the user can hold down the security button or select a different button on the key fob or app on a smartphone. This will trigger elevated security sirens, more lights, voice comments notifying people near the vehicle that the area is being recorded and/or sent to the authorities.

As can be appreciated, by providing users with multiple levels of security activation, users can be provided with higher levels of security when approaching a vehicle alone or with small children. Any recordings, images, clips, audio recorded proximate to the vehicle can be shared with others. The sharing can be by way of email, text, application notifications, cloud access to storage holding data, events and data, etc. In one embodiment, the historical data for this user can be saved by the cloud services. In one embodiment, for other registered users of the cloud services, information from all or some of the historical data of events can be saved and used to map out a history of events for selected locations. The locations where events occurred can be mapped out using GPS data and time data.

In one embodiment, users of the service can access an app or cloud service account to determine the historical safety of a particular location or parking slot. This data can also be shared with parking locations, building owners, and others that can take corrective measures to improve security. In one embodiment, the data from historical events triggered at locations can be shared anonymously, without disclosing the identity of the car/user that triggered the alarm. This sharing will encourage others to share the data to collectively improve safety for particular parking areas.

In one embodiment, a vehicle can sense and collect data in its surroundings before a user decides to approach a vehicle. For instance, a vehicle can monitor a proximity volume around the vehicle automatically. In some cases, people will come in contact or in near proximity to the vehicle, but those actions would not be viewed as triggering an alarm. If, however, some activity is determined to be unusual, based on predefined rules, the vehicle can store the activity. If the activity continues (e.g., a person continues to look into the vehicle, is looking under the vehicle, approaches the vehicle too many times over some period of time, etc.), that information can be provided to the user/owner of the vehicle as a notification.

If the user gets this notification, the notification can include video clips or images of the events. By having this information ahead of time, the user can determine whether or not to approach the vehicle at all, and possibly notify the authorities or local security. If the notification simply shows other users getting into and out of their cars beside the user's vehicle, that notifications can be ignored by the user.

In other embodiments, when a user is attempting to park at a particular location, the vehicle can advance notify the driver of the probable safety for the location at which the user is about to park. If the location is the site or proximity of some threshold number of previous alert or security events, the driver can be notified so that the driver can determine if he or she still wishes to leave the vehicle parked at that location.

The system can also, in one embodiment, recommend a safer parking spot or location that is proximate to the current location. For example, the user can be recommended to park closer to one side of a building than the other, or at another parking garage with lower level of historical security triggered activities.

FIG. 1 illustrates a general example diagram of a user 110 operating a key fob 104 or a portable device 105, to communicate with a vehicle 102, in accordance with one embodiment of the present invention. As shown, vehicle 102 can include vehicle electronics 103, and a plurality of sensors 108. The sensors 108 can be distributed at one or more locations on the vehicle 102, and the sensors can communicate with vehicle electronics 103. Vehicle electronics include electronics for controlling components of vehicle 102 and for communicating with a network. Vehicle 102 can communicate with cloud processing 120, for example, over the Internet. Communication can be by way of wireless communication.

The wireless communication can include cellular tower communication that couples and communicates through various networks to the Internet, to provide access to cloud processing 120. Other methods can include providing Wi-Fi communication to local Wi-Fi transmitters and receivers, which communicate with cloud processing 120. Other types of communication can include radio frequency communication, such as Bluetooth communication or combinations of Wi-Fi and Bluetooth. It should be understood that vehicle 103 can communicate with cloud processing 120 via any number of communication methods, so long as exchanges of data can be made with cloud processing 120 from time to time.

The communication can be made by vehicle electronics 120 while the vehicle is on or when the vehicle is off, so long as communication and processing circuitry of vehicle electronics 103 has a power source. The power source can include battery power that powers vehicle electronics 103 to communicate with cloud processing 120 when vehicle 102 is turned off. When vehicle 102 is turned on, the battery that drives vehicle he tries 103 can be recharged.

In the illustrated example, user 110 can use a key fob 104 to communicate directly with vehicle 102. Key fob 104 can include a plurality of buttons that allow the user 110 to open the vehicle, lock the vehicle, push a panic button 104A, or push a record button 104B. In one embodiment, the record button is a 2nd button that provides the user 110 with a precautionary level of security when the user feels uncomfortable or desires to access the vehicle from a remote location.

By pressing the record button, the user can activate a security radius around vehicle 102, where in the security radius may cause vehicle 102 to start recording data around the vehicle, and may light up the area proximate to the vehicle using its lighting. It should be understood that the record button can take any other name, and is not limited to being called a record button. In one example, the button can be viewed as a security escort button, a caution button, or can be integrated with the panic button so that multiple presses of the panic button can activate different levels of security.

In one embodiment, vehicle 102 will integrate additional vehicle lighting so that the vehicle will appear lit up and will alert nearby persons that the vehicle is being monitored and/or being recorded. As the user 110 walks towards the vehicle, the vehicle will record its surroundings and will light up the space so that the user 110 can approach the vehicle. This process may be used by the vehicle owner when desiring to approach the vehicle in an area that may not appear to be safe. The area not appearing to be safe can include, low lighting in the parking location, hovering or proximity of other people near the vehicle that may appear to be less than safe, or for any other reason that the user feels uncomfortable or has a desire to obtain more security when approaching vehicle 102.

In one embodiment, if a person approaches the vehicle 102 when user 110 is walking towards the vehicle, or the person is hiding behind vehicle 102, vehicle 102 can record and or alert the person that the vehicle is being monitored. The person can be alerted with a sound, or a voice that communicates out loud to the area around the vehicle 102 that the area is being recorded, and that the vehicle owner is approaching. If when the user 110 is walking toward the vehicle 102, some condition changes, such as the user 110 becoming more apprehensive of his or her security, the user can then push the panic button 104A. This will cause an elevated level of activity for vehicle 102.

The elevated level of activity can include (in addition to recording the area around the vehicle and turning on the lights around the vehicle) sounding a siren and voicing a warning to anyone in the proximity of the vehicle that they are being recorded and the authorities have been notified of the current alarm condition. If when the user arrives at the car and the user feels safe, the user can turn off the panic button and can also turn off the recording. In one embodiment, the recordings and the triggering of the alarms can be saved to memory and storage of vehicle 102. In another embodiment, the recordings and data associated with the recordings and triggers alarms can be saved to cloud processing 120 automatically.

The saving of this data to cloud processing 120 allows user 110 to maintain a history of the times the alarm or triggers alarms occurred for vehicle 102, and the locations where the triggers occurred. In another embodiment, when more vehicles include the monitoring features described herein, those vehicles can also report different trigger an alarm conditions. Because the cars can be tracked for location using global positioning satellites (GPS), the position of the car when the triggers were detected (and any clips of video, images or metadata saved to the servers in cloud processing 120) can be communicated to databases of a service that monitors vehicle 102, using cloud processing 120. For example, if a plurality of cars sign up for a service, which include assigning accounts to different users of vehicles, when vehicles experience or trigger alarm conditions or recording conditions, that data can be saved to cloud processing 120.

By consolidating and analyzing data from a plurality of vehicles, it is possible to determine locations that may not be safe, or can be predicted to not be safe based on the number of trigger conditions that occurred (e.g. in proximity to a GPS location or locations). In another embodiment, the key fob 104 can be represented as an APP (application) on a portable device. The APP can include graphical user interface icons 104' that represents images of key fob 104. Thus, the user can also access the vehicle 102 using a graphical user interface that resembles key fob 104.

In one embodiment, the user 110 is registered with cloud processing 120 that will provide access to vehicle 102 over an application. User 110 will be allowed to access the application and the vehicle 102 upon being certified using accounts and passwords. Additional security, such as encryption may also be used to prevent hacking of access codes. Accordingly, the user can be accessing vehicle 102 using a key fob 104 or a portable device 104', or also a computer connected to the Internet.

Figure 2:
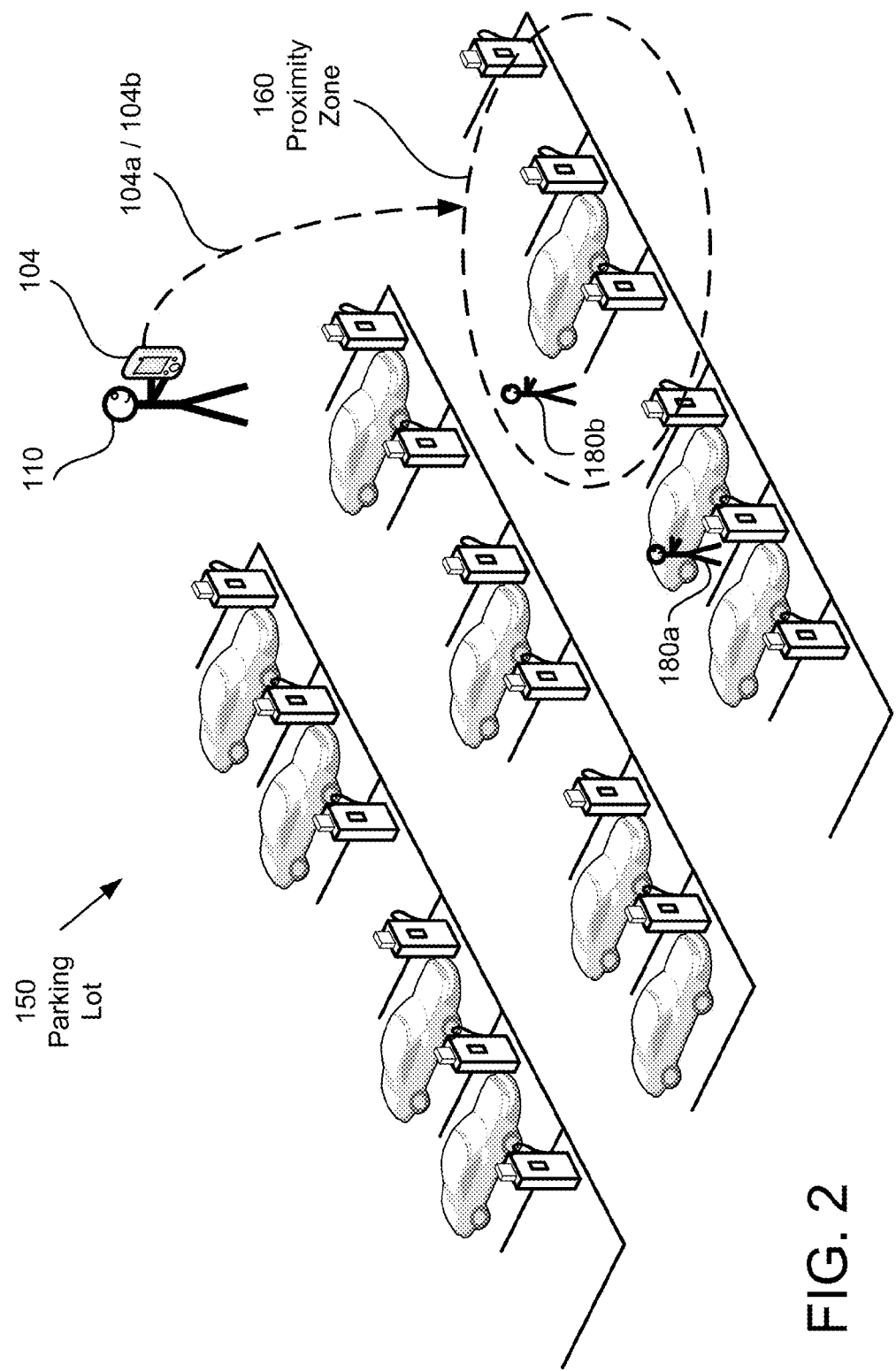
FIG. 2 illustrates an example of a parking lot where user uses the key fob to communicate with vehicle.

FIG. 2 illustrates an example of a parking lot 150 where user 110 uses the key fob 104 to communicate with vehicle 102. In this example, the parking lot shows vehicle 102 in a remote location of parking lot 150. When the user 110 selects the record button 104, the proximity zone 160 will light up, and may alert people proximate to the vehicle 102 that vehicle 102 is being monitored. Alternatively, if a user 180a is not proximate to vehicle 102, vehicle 102 will not signal a voice command regarding its monitoring.

If person 180b approaches the proximity zone 160, the person will be alerted that vehicle one or 2 is recording the proximity as user 110 approaches the vehicle. In one embodiment, user 110 can also be notified via a portable device that the proximity zone 160 around vehicle 102 has a person 180b proximate to the vehicle. At that point, user 110 can decide whether to approach the vehicle or not approach the vehicle, or to select the panic button 104a if user 104 feels threatened of its safety. Although this example shows a planar two-dimensional parking lot 150, the remote access into the vehicle can include accessing vehicles in parking structures that are multilevel, approaching vehicles in homes, approaching vehicles at work, approaching vehicles in any other location.

In the example of FIG. 2, user 110 was notified of the proximity of the user when the user entered the proximity zone 160. In one embodiment, if a person had been in the proximity zone 160 for some time before user 110 approaches the vehicle 102, a notification can be sent to the portable device or computer or account of user 110 that a person had been within a threshold proximity around the vehicle. This type of activity can be predefined based on rules, as being suspicious. Other types of activity around vehicle 102 can also be defined as suspicious and added to a rules database.

Figure 3:
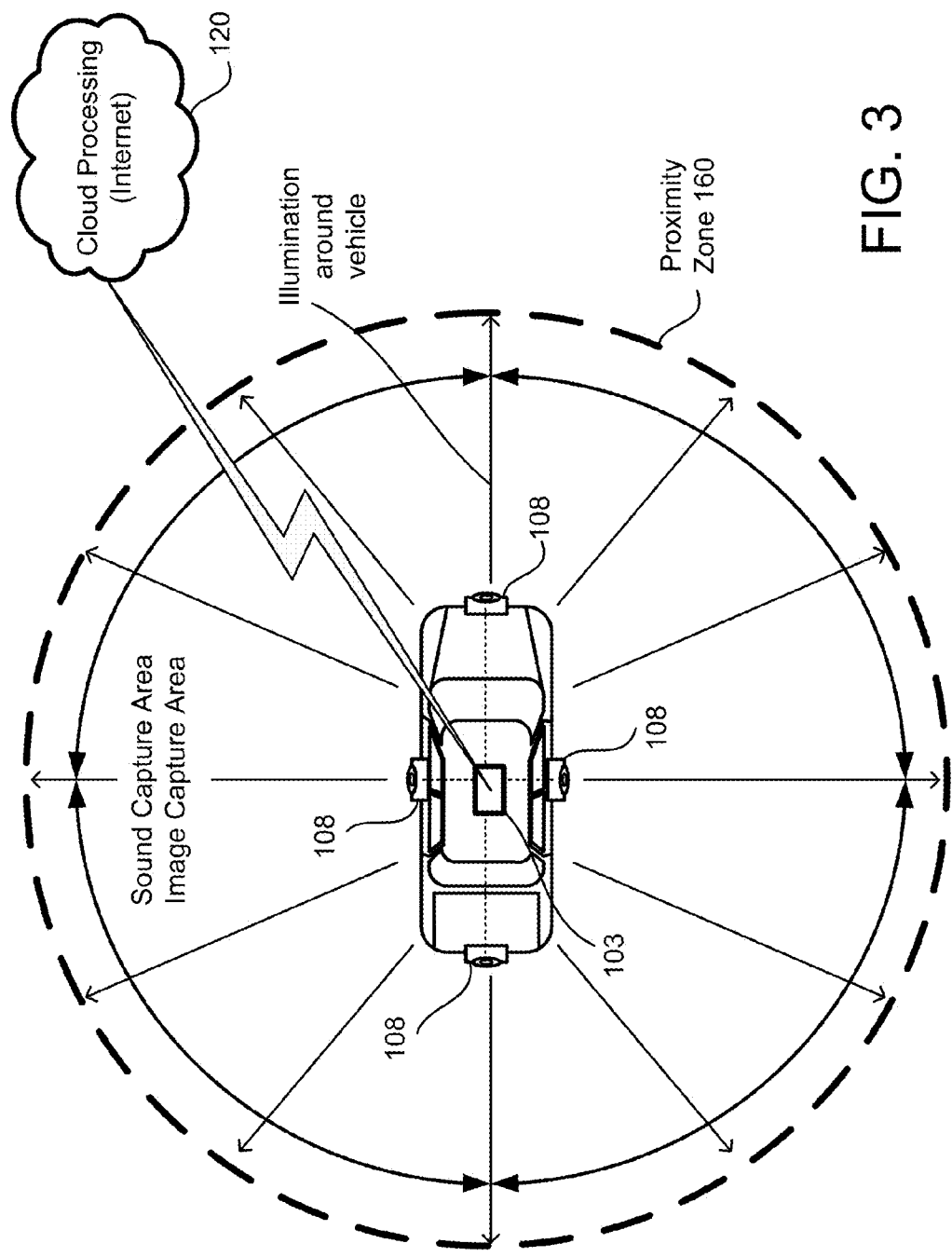
FIG. 3 illustrates an example of a proximity zone around a vehicle.

FIG. 3 illustrates an example of a proximity zone 160 around vehicle 102. As a basic example, sensors 108 are located on four sides of vehicle 102, and in communication with vehicle electronics 103. It should be understood that the number of sensors can be many more than four, and can be located on more than four sides of the vehicle. In some embodiments, multiple sensors can be located at one side of the vehicle, on top of the vehicle, below the vehicle, and combinations thereof as well as a rotating, panning, tilting and patrolling 360-degree sensors.

As illustrated, the sensors 108 can be configured to capture image data around the perimeter of the vehicle 102 in proximity zone 160. In addition, optional sound capture can also be conducted within the perimeter 160. The perimeter 160 size can vary depending on the type of sensors utilized, or can be programmatically adjusted by the user. The user can, for example, reduce the radius or sensitivity of the proximity zone 160 so as to reduce the number of alerts that are received during a monitoring session. In other embodiments, the radius or sensitivity of proximity zone 160 can be maximized when the user needs to access the vehicle in unsafe conditions or environments. The sensing data, control and capture, can be communicated between vehicle 102 and cloud processing 120 utilizing vehicle electronics 103, and its communication systems. Also shown in FIG. 3 is the concept of illuminating the area around vehicle 102.

This illumination area 102 can include special illumination lighting around the perimeter of the vehicle. The illumination lighting can include, for example, LED lighting at the base of the vehicle that lights up floor or ground area around the vehicle with high magnification.

In one embodiment, the illumination lighting can be color coded. If a person is hiding or standing proximate to the vehicle as a user walks toward the vehicle that is illuminated, the illumination color or glow around the vehicle can change. If rules suggest that it is dangerous to approach the vehicle, the glow may be red, if it is safe, the glow may be green, or some other shades of color. The color can also switch from one color to another, as the user approaches with higher security needs.

In other embodiments, additional illumination lights can be provided in the vehicle that are activated based on motion capture. For example, if the user is attempting to approach a vehicle that is currently being monitored, if a person is hiding behind the vehicle, the lighting in the area where the person is sensed (using motion detection, heat detection, sound detection, or a combination thereof), the lighting on that person can be magnified.

Additionally, sound can be directed toward persons that may be in the proximity zone 160 when a person is approaching vehicle 102 in a safety mode. As will be described below, the safety modes can be set by user depending on the level of safety desired by the user when approaching vehicle 102. The safety levels can be low levels, such as lighting up the proximity zone 160 or simply emitting low-level sounds. In more elevated levels, the user can decide to automatically capture image data and send captured image data or video to third parties using cloud processing 120. Additionally, if a vehicle's ability to transfer, record or activate passive or active safety features are compromised, deactivated or tampered with, an emergency S.O.S signal may be sent to the user of the vehicle using any remaining operative sensor data. This signal may also be sent to authorities and captured by cloud processing.

Figure 4:
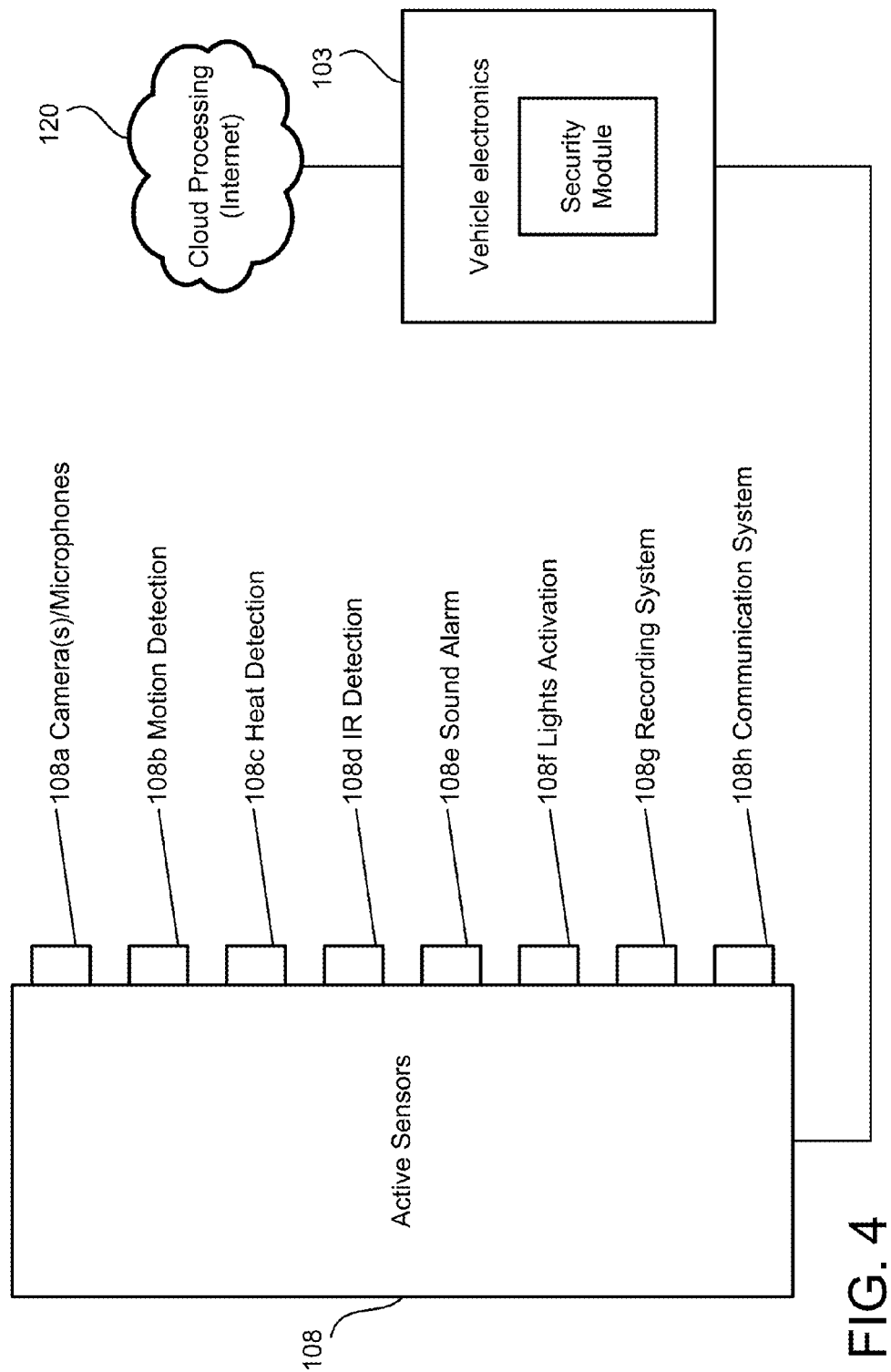
FIG. 4 illustrates an example of a plurality of active sensors.

FIG. 4 illustrates an example of a plurality of active sensors 108. The sensors shown in FIG. 4 are only for example, and additional sensors can be added or removed depending on the level of security provided by the sensing system of a vehicle 102. Examples include sensors 108*a*-108*h*, which can include cameras and microphones, motion detection sensors, heat detection sensors, infrared (IR) detectors, sound detectors light activation sensors, recording system sensors, communications system sensors, gyroscopes to detect contact with the vehicle by a person or object, trigger logic, rules databases for activating sensors in response to specific triggers, or combinations thereof.

In one embodiment, some or all of active sensors of the vehicle can be enabled when the vehicle is off or on, or some can be enabled upon receiving a request to enable some of the sensors from a user (e.g., when the user of vehicle decides to approach the vehicle, or wishes to view the vehicle remotely or activate some feature of the vehicle remotely). As shown in FIG. 4, the plurality of active sensors of a vehicle can include several types. For example, some active sensors are of a first type, which can collect data. The data collected can be from cameras, recording sound or video or images, motion sensors, IR detectors, sounds detectors, etc. A second type of sensor can include those that produce actions. The actions can include, for instance, sounding a horn, turning on the vehicle, turning on a feature of the vehicle, turning on lights, flashing lights, sounding alarms, activating voice warnings, sending notifications, etc. In other embodiments, the active sensors can produce or take actions in combinations of ways, that include both the first type of sensors and second type of sensors. It should be understood that the more types beyond the first and second are possible, and can be used in combinations thereof.

Active sensors 108 are in communication with vehicle electronics 103. Vehicle electronics 103 can include security module 103*a*, which is integrated with vehicle electronics 103 or can be an add-on module that communicates with vehicle electronics 103. Vehicle or consular 3 is in communication with cloud processing 120.

Figure 5:
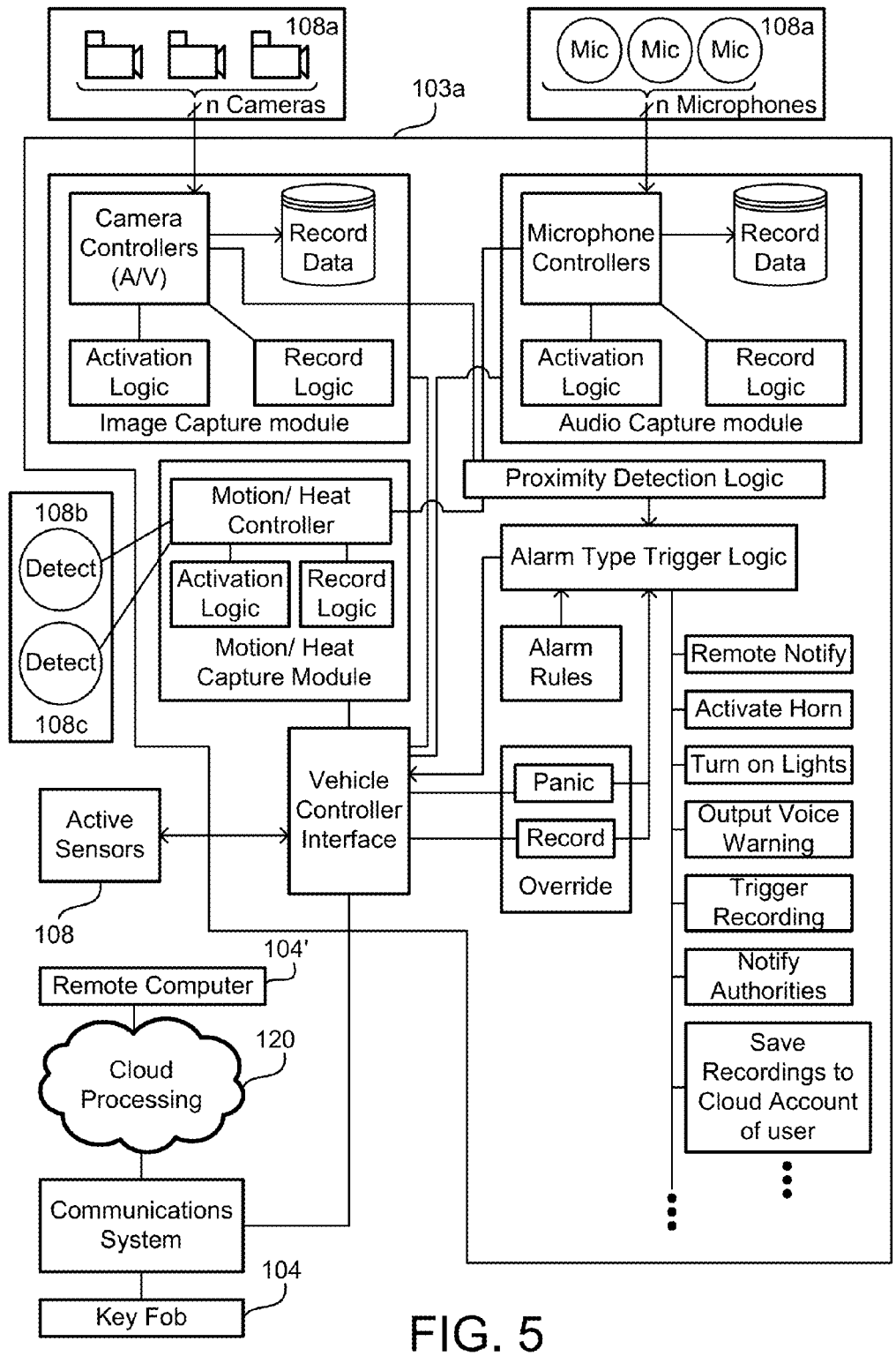
FIG. 5 illustrates example modules that are part of security module, in accordance with one embodiment of the present invention.

FIG. 5 illustrates example modules that are part of security module 103*a*, in accordance with one embodiment of the present invention. As noted in FIG. 4, security module 103*a* can be integrated in or interfaced with vehicle electronics 103. The following modules are exemplary in nature, and it should be understood that more or less modules may be part of security module 103*a*. With this in mind, an image capture module is shown to include a camera's controller for communicating with a plurality of cameras 108*a*. A camera's controllers can then be interfaced with activation logic and record logic. Activation logic can signal to the cameras controller that one or more cameras need to be turned on or off, and the record logic can control the camera's controller to signal recording from particular cameras.

The recording data can then be saved to local storage, and later communicated to cloud processing 120 for additional storage remotely from the vehicle 102. Also shown is an audio capture module that includes a microphone controller. The microphone controller is in communication with the plurality of microphones 108*a*. A microphone controller may be communicating with activation logic and record logic to set when one or more of the microphones should be recording and the recording data can be saved to the local storage. Just as image data can be saved to cloud storage using cloud processing 120, the microphone data that is recorded can also be transmitted to cloud storage in cloud processing 120. Further, optionally included in security module 103a is a motion/heat capture module.

This module can include a plurality of controllers to capture either motion or heat data surrounding vehicle 102. The sensors around vehicle 102 can detect when heat of a human body is proximate to the vehicle 102, or if heat is coming from another vehicle that may have been running. The motion controller can also detect when motion is occurring proximate to the vehicle 102. Various sensors 108b and 108c can be located in and around vehicle 102. Proximity detection logic may be in communication with the image capture module, audio capture module, motion/heat capture module.

Data inputs from these various modules and their respective sensors can then be processed by proximity detection logic. Proximity detection logic can implement a plurality of rules to determine when people, objects, heat, or obstacles are proximate to vehicle 102. This data can then be transferred to an alarm type trigger logic. Based on the different sensor data collected by the proximity detection logic, the alarm type trigger logic can operate to trigger different types of alarm activations, based on alarm rules. Alarm type trigger logic can trigger a plurality of actions and without limitation can include, remote notification, activation of horns, turning on or off of lights, output of voice warnings, triggering of recordings, notification of authorities, saving of recordings to cloud storage of user accounts, notifications to third parties, and combinations thereof. In one embodiment, the alarm type trigger logic is also in communication with vehicle controller interface. Vehicle controller interface can include electronics of the vehicle, which are native to the vehicle. These electronics can serve to turn on existing lighting of the vehicle, horns of the vehicle, settings of the vehicle, etc. Each vehicle maker can include different controller interface and can include application interface that enable security add-on modules to be connected to the vehicle controller interface.

Vehicle controller interface can also link to communications systems of the vehicle. The vehicle's communications system will enable the vehicle 102 to communicate with cloud processing 120. Communications Systems of the vehicle can also enable users to communicate with the vehicle using a key fob 104. A user with a remote computer or network connected mobile device can also communicate with cloud processing 120 which in turn communicates with the vehicle via Communications Systems in security module 103a or other logic that is native to the vehicle and manufacturer. In one embodiment, an override signal can be monitored to receive input from the user. The input from the user can be in the form of receiving a panic button input, which can trigger the alarm types to activate certain ones of the trigger alarms and notifications.

In another embodiment, the override can include a record button. In this embodiment, the record button is a lower level security feature that may be lower level than a panic. For example, a user that wants to be cautious when approaching the vehicle in an unlighted place may decide to push the record button that will activate certain features on the vehicle, such as lighting, sound indicators, the camera sensors, the microphone sensors, etc. However, the record button may not necessarily mean that the user is indeed in trouble. If while the user is approaching the vehicle in the record mode the user determines that an actual panic or higher-level security activity is warranted, the user can then press the panic button. The panic button provides an activation of more security features of the vehicle, such as auto notification of police, recording clips of data in the vicinity of the vehicle being transmitted to authorities, notification of local security, etc.

If the user is not approaching the vehicle and the vehicle is simply being monitored from a remote location or being monitored to allow access from remote a location, the override button is not selected. In this case, the alarm type trigger logic would utilize alarm rules to decide which types of triggers alarms will be set. Additionally, notifications to the user may be sent via mobile phone application notifications, e-mails, texts, and other communication methods. The notifications can include video clips, images, sounds files, and metadata related to the trigger event.

Based on the type of detected events, certain data will be transferred to the user in the form of notifications, or simply added to the history file of the vehicle when parked at a particular location, and assigned a time tag for when the event occurred. The user can then access a mobile device, or any computer connected to the Internet to view any activity that has occurred to the vehicle when away from the vehicle, and any notifications concerning triggers of alarms. By having this information before approaching the vehicle, the user can proceed to the vehicle with more or less caution.

Figure 6:
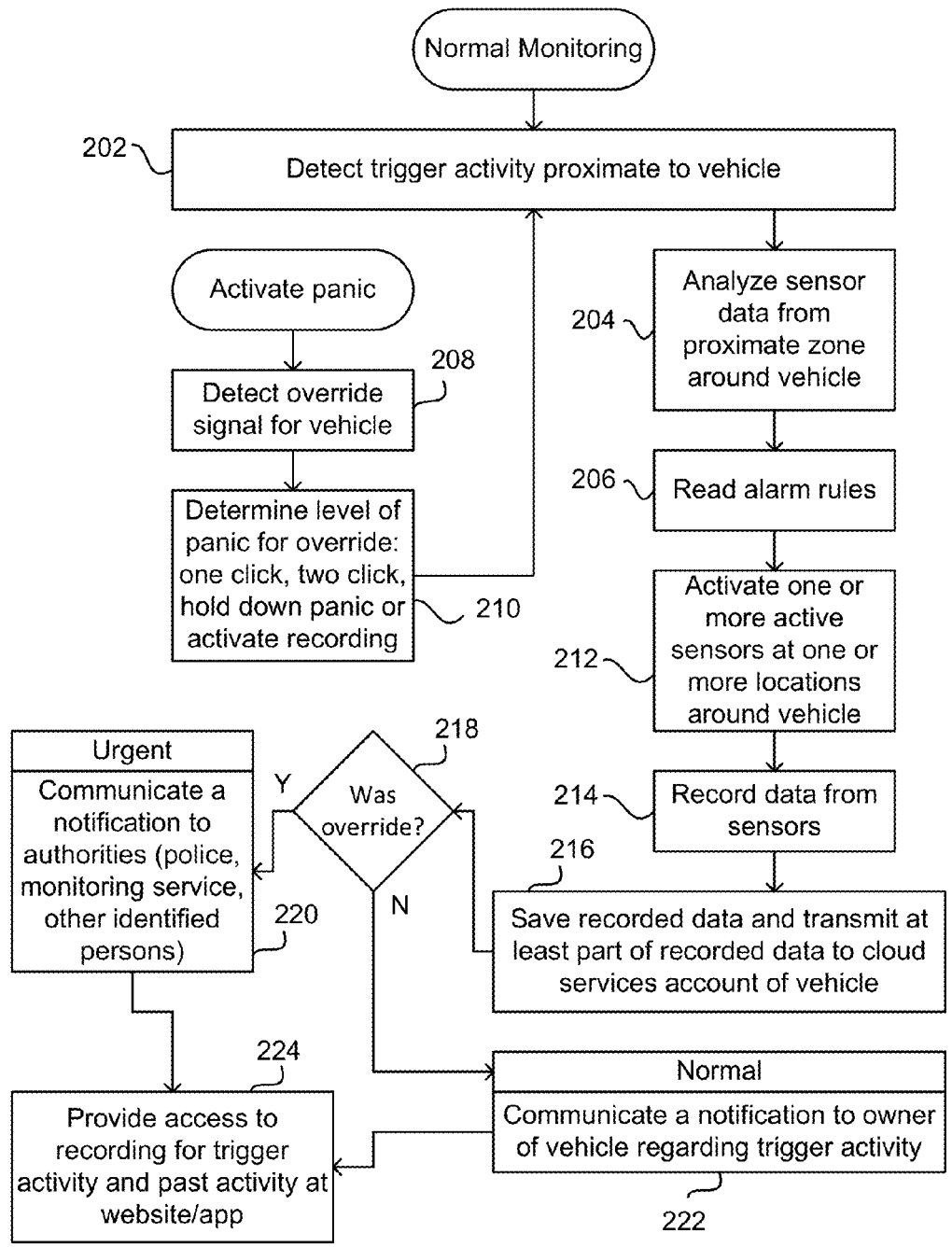
FIG. 6 illustrates an example of operations that may be processed in some embodiments of the present invention to activate certain alarms for security of a vehicle and security of the vehicle's user, driver and or occupants.

FIG. 6 illustrates an example of operations that may be processed in some embodiments of the present invention to activate certain alarms for security of a vehicle and security of the vehicle's user, driver and or occupants. As illustrated, one method can include allowing for normal monitoring of the vehicle when the user is away from the vehicle and may not be approaching the vehicle. In another embodiment, the user may be activating a panic button or a record button or a low-level security button when approaching a vehicle. This type of activity may be referred to as an override signal for the vehicle, which will actively inform the vehicle to set one or more alarms depending on the level of security desired by a user who may be approaching a vehicle, or who may be preparing to approach a vehicle from a remote location.

The normal monitoring may occur when the user is away from the vehicle, but may still wish to receive alarm conditions or data regarding the vehicle as notifications that may be viewed from the user's account from cloud processing application. The method may include the operation 202 during normal operation that detects a trigger activity proximate to the vehicle. The trigger activity may be simply detection of a person walking by the vehicle, a person talking near the vehicle, a person attempting to break into a vehicle, a collision detection from another vehicle or object, etc. The sensor data in operation 204 is analyzed to determine if the activity has occurred within the proximity zone around the vehicle. If the activity has been detected within the proximity zone, the system will read alarm rules 206 to determine the type of alarm to sound. The alarm can include audible sounds or simply triggering of applications or notifications or recordings, or combinations thereof.

As noted, the rules can be pre-set for the specific user, can be set based on historical events, can be set based on the time of day, can be set based on the location where the vehicle is parked, or other combinations of settings that can be made part of logic rules. In operation 212, one or more of the active sensors at one or more locations around the vehicle may be activated. For example, cameras may be activated to record, sounds may be activated to be emitted, lighting may be activated to spotlight particular objects or people in the vicinity of the vehicle, etc. Operation 214 indicates that data from the sensors may be recorded. The recorded data can then be temporarily saved at the vehicle. In operation 216, the recorded data can be saved and transmitted to a remote cloud services account for storage. The data can then be made accessible to persons having access to the user's account, monitoring services, authorities, etc. A determination can be made in operation 218 to determine if the alarm was due to an override.

In this example, no override signal was sent so the method moves to operation 222, where normal monitoring would communicate a notification to the owner of the vehicle regarding the triggered activity. The notification can be sent to third parties, persons that may be driving the vehicle temporarily for (for example with a temporary user account for the vehicle), to the police, the local monitoring services, to monitoring services of the user where the car may be registered.

In another embodiment, the trigger may be due to an override signal being sent to the vehicle in operation 208. This might be the result of an active panic. Active panic is simply a notation that can be thought of as a user desiring to seek higher levels of security when approaching a vehicle. In operation 210, it is determined that the level of panic for the override is a single click, a double-click, a hold down of a panic button, or inactivation of recording.

These are only examples of the types of levels that can be signaled by user when an override condition is triggered. Additional types of signals can be sent by the user via customized levels and activities that may be programmed through user interface from an application that is provided to users having accounts to a security program. Based on the level of security set by the override in operation 210, the alarm rules are read in operation 206. At this point, operations 212 to 216 are processed and it is determined that operation 218 that override condition was true and in urgent communication or notification can be sent to authorities in operation 220. The police, monitoring service or other identify persons can then see the notification, and in operation 224 access is provided to recordings for the triggered activity and/or past activity at the vehicle via a website or application. In one embodiment, this data that is sent to cloud processing regarding an event can be shared with others within a proximity threshold of the event (e.g., either when a user/device requests the data or via a push notification, or combinations thereof). For example, if an event is triggered 5 parking spaces away (or any other predefined distance) from a different user's vehicle with monitoring services enabled, the user of the second non-affected vehicle may receive a report/notification that an incident has occurred nearby and that user should use extra caution. This data can be in the form of a report with a certain time interval cadence or an on-the-fly alert or notification (e.g., email, application notification, text, voice message, etc.)

Figure 7:
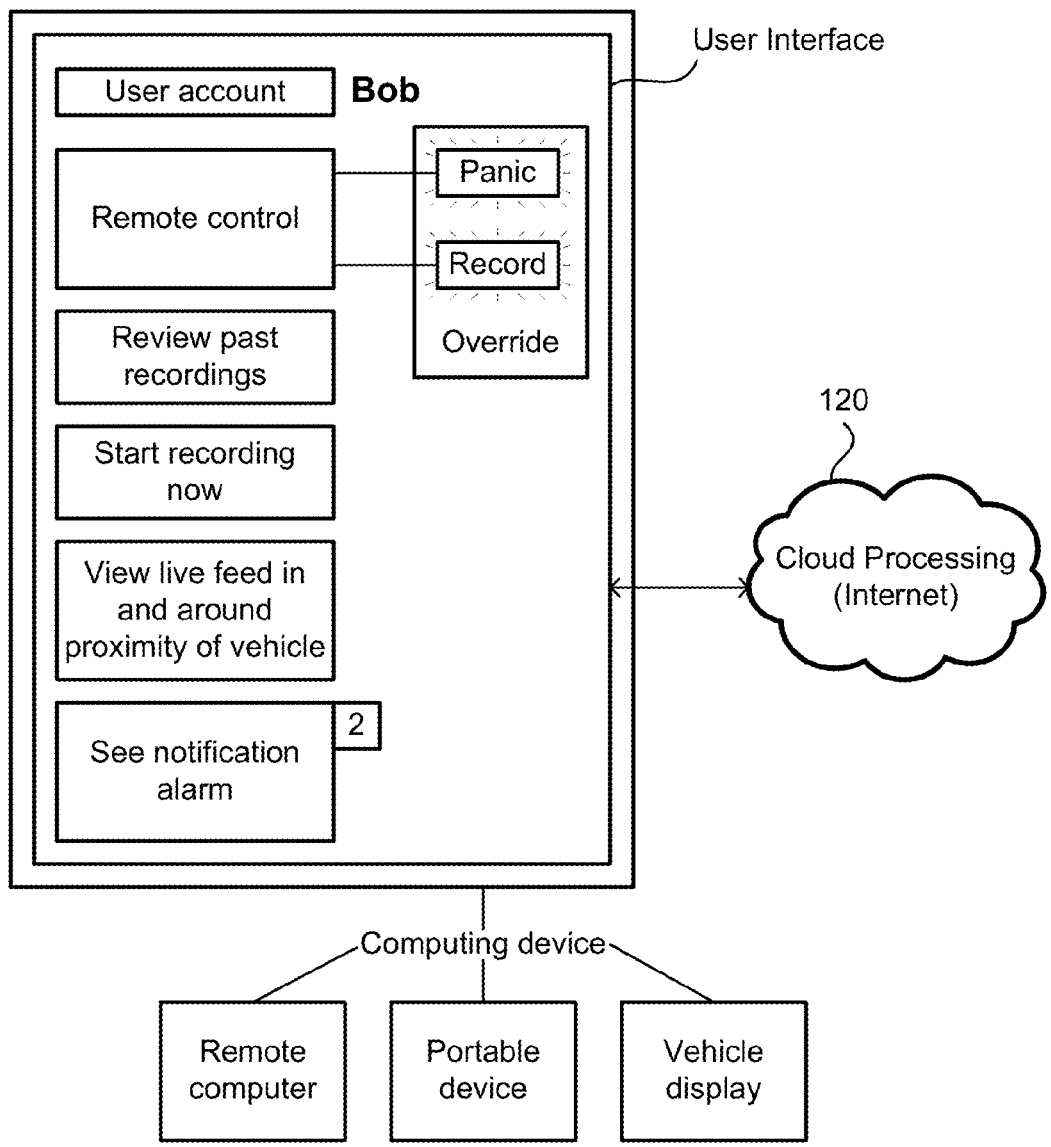
FIG. 7 illustrates one example of a user interface that may be provided to a user from a computing device, in accordance with one embodiment of the present invention.

FIG. 7 illustrates one example of a user interface that may be provided to a user from a computing device, in accordance with one embodiment of the present invention. The computing device can include a screen with the user interface. The computing device can be the interface and device of a vehicle in a dashboard. In another embodiment, the user interface can be a display screen for a computing device. In another embodiment, the user interface can be the display screen on a portable device, such as a smart phone or tablet.

In this example, icons can be provided to the user to provide easy access to the users account, in this case user Bob. The user can then manage his user account through a website that communicates with cloud processing 120, if the user has registered with the security system that's operated by cloud processing 120. Remote control can be provided to the user via a remote control icon. The user, through the user interface can then select override signal such as panic and record directly from the computing device, without needing to access a key fob. The user can also review past recordings or start recording now, view live feeds in and around the proximity of the vehicle, see notifications and alarms.

The user can be provided with a set number of alarms and notifications that, once selected can show historical data of notifications, alarms and the like. The remote computing device, as noted above can be a remote computer, a portable device, a vehicle display, or any other computing system. The user interface can also provide the user with historical data regarding parking spaces are parking locations where the vehicle may be parked. The user can also be provided with recommendations of safer locations the park the vehicle 102. The recommendations can be obtained by looking at historical alarm conditions from other vehicles for specific parking locations.

This information can therefore qualify specific locations and parking slots for vehicles actively when the user selecting parking spots in a public location. In one embodiment, the recommendations can provide historical data of actual events that occurred at the specific location. By having this information, users can make informed decisions and where to park the vehicle is security may be an issue or is sense to be an issue.

Figure 8A:
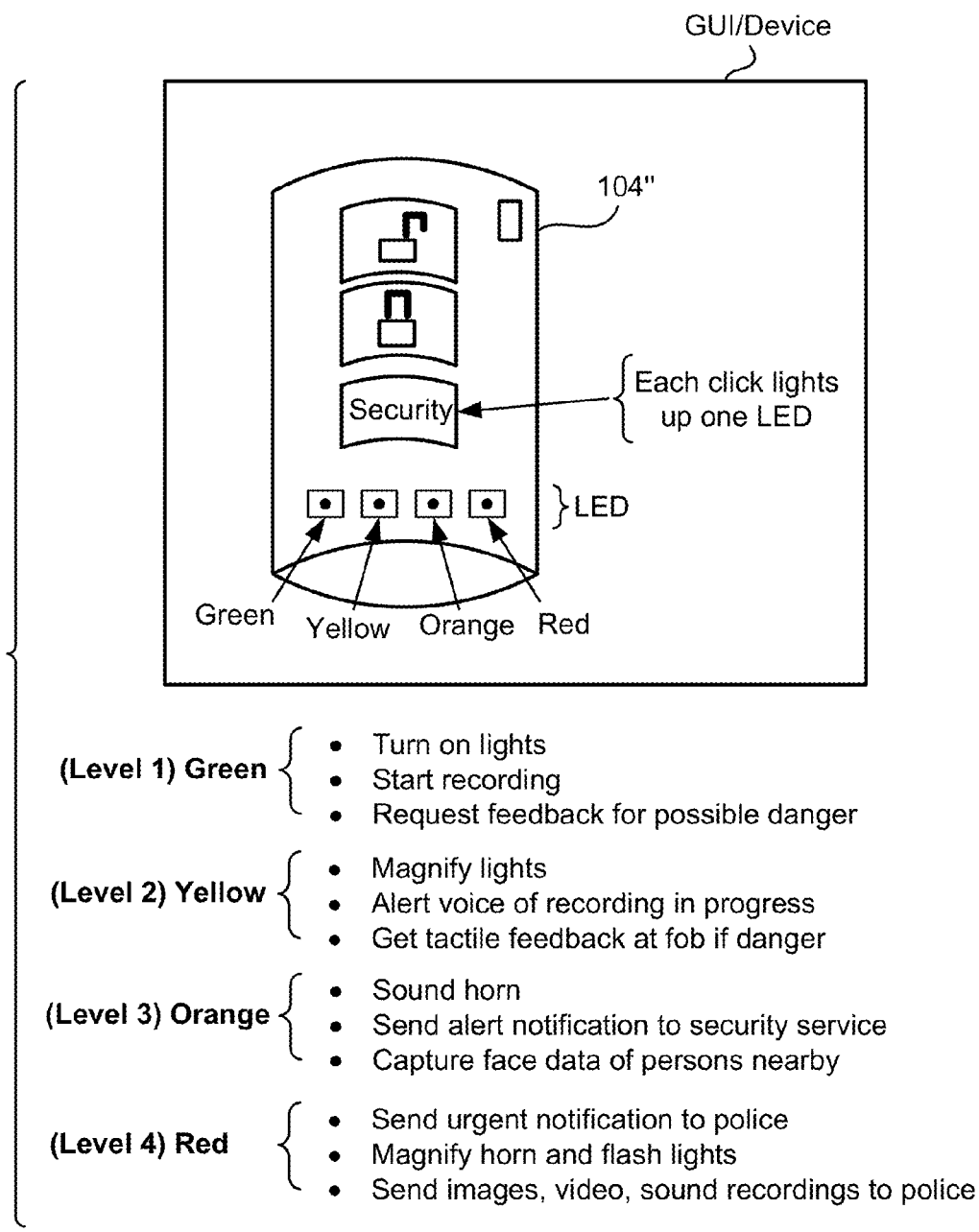
FIG. 8A illustrates an example of a key fob that can include a number of buttons and lights, to indicate different colors or security levels.

FIG. 8A illustrates an example of a key fob 104" that can include a number of buttons and lights. In this example, the key fob can also be represented in a graphical user interface (GUI) of a computing device. For purposes of illustration, a security button is provided on the key fob and a plurality of LED lights are provided on the surface of the key fob 104. The LEDs can be colored or not. If colored, they can provide different types of colors for higher or lower levels of security. The lights can blink, and/or can stay lit as the next light turns on. For example, one click turns on the first, the next click turns on the next, etc.

If the user is using a GUI of a computer screen to activate functions of a key fob, the color codes can be shown on the screen, and the user may be able to simply select the exact level without multiple clicks. Specialized key fobs can also provide this functionality and can be linked to the user's smartphone app. For example, a key fob can be made to communicate data between a smartphone or computer.

In one embodiment, if the user selects the security button once, a level 1 security is activated, which may be shown with the green LED. This is a lower-level security with the user wants to be cautious when approaching a vehicle. The user can then select the security button a second time which lights up the second LED in a different color, such as yellow. The yellow color may indicate a level 2, which may activate different levels of security for the vehicle as shown in the example triggers. If the user pushes the security button a third time, a level 3 securities activated, which may trigger additional security measures than those for levels 1 and 2. This may be shown as an orange LED on the key fob, or on the display screen of the user's application. Similarly, if the user selects the security button a fourth time, a red LED will be lit indicating the highest level of security, which is shown as level 4. In this example, more aggressive levels of security and notifications are triggered as the user selects a higher level of security from the key fob. The levels of security are only examples, and more or less levels may be used and more or less lights or indicators may be provided to select the particular security input.

In one embodiment, the key fob can receive voice input commands from the user. The user can activate the security level by simply speaking and the key fob or portable device can detect the sound and identify the individual as the owner or operator of the vehicle, and then apply the security level.

In one embodiment, lower levels of security may be activated when a user is approaching a vehicle and feels relatively safe. As the user feels that his safety has diminished, the user can selectively increase the level security as the user approaches the vehicle. This acts to provide preventative measures for approaching the vehicle, such that nearby criminal entities will be notified of the security and surveillance by the vehicle, the fact that the area is being recorded, and the fact that authorities are being notified. In one embodiment, by enacting the multilevel security system for vehicles, the security of their occupants or owners can be enhanced.

In other embodiments, the multiple levels of security can also be activated when the user is in the vehicle. For example, if the user is in the vehicle and is approached by criminal entities, the user can select the security button inside the vehicle to activate one or more the security systems described in FIG. 8A. Accordingly, the security system will provide for higher levels of security to occupants as well as to owners and users of vehicles when approaching the vehicle in an unsecured location.

Figure 8B:
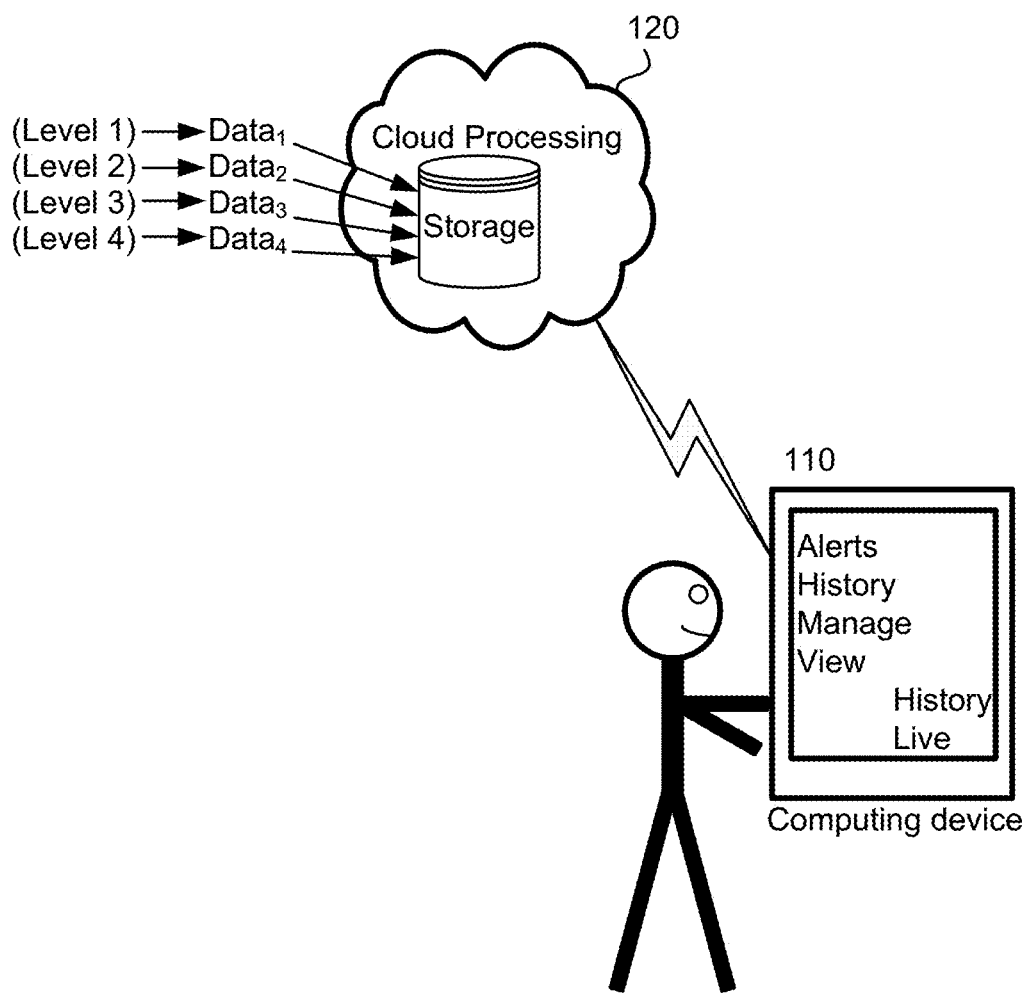
As shown in FIG. 8B, the data captured and triggered from the various levels of security can be communicated to cloud processing and saved in cloud storage.

As shown in FIG. 8B, the data captured and triggered from the various levels of security can be communicated to cloud processing 120 and saved in cloud storage. A user 110 can then access via in cloud processing storage 120 from a remote location using any computing device. The user can then view the number of alerts, history, manages account, view the history, or view live recordings or live activity in and around the vehicle.

Figure 9:
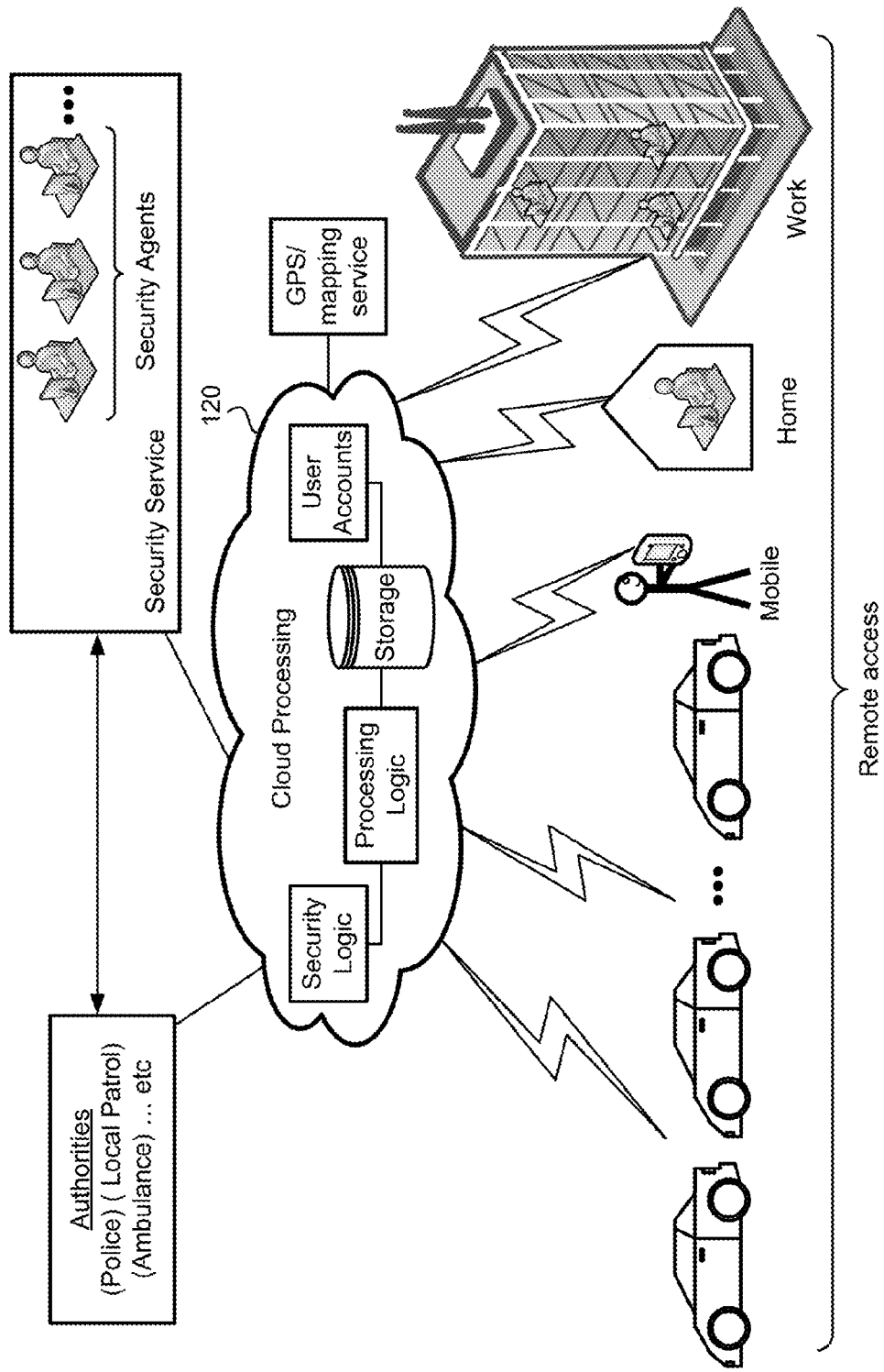
FIG. 9 illustrates an example where cloud processing manages accounts for users, in accordance with one embodiment of the present invention.

FIG. 9 illustrates an example where cloud processing 120 manages accounts for users, in accordance with one embodiment of the present invention. The cloud processing can include security logic for processing the various logic operations described herein, including processing logic for accessing storage and accounts for users and triggering notifications to security services, and authorities. In this example, the cloud processing can include storage for receiving the data and user accounts for granting access to the data to various users.

The access to the data can also be encrypted to prevent unauthorized access to the data. GPS and mapping services can also be in communication with the cloud processing 120 provide data concerning the locations of the vehicles and activities that occurred to the vehicles when at particular locations. The cloud processing can be access by the vehicles themselves using their electronics and communications, via mobile devices, from home, from work, etc.

The security service can include security agents that monitor and receive trigger events from cloud processing from the various vehicles. The security service can be automated, or can include live people that handle specific events for members of an account and a service. The security service can also be in communication with authorities to contact police, local patrols, ambulances etc. The cloud processing can also be in direct communication with the authorities without having to communicate with security service agents of a security account for a vehicle or vehicles. Reports can then be generated by cloud processing for specific owners of vehicles so that owners of vehicles can understand historical security breaches or triggers that have occurred and the location where that has occurred.

The owners of the vehicles can also access cloud processing to get recommendations of safer locations the part based on historical data of other vehicles that have experienced security events. These past security events can be mapped to a heat map that identifies where the events occurred, and how long ago the events occurred. If events concerning security have occurred often in a specific location, but those events occurred years ago, the heat map will deemphasize those events over events that have occurred more recently.

Recommendations to the users can then be populated based on more accurate and recent activity. For example, if a garage operator has recently improved security, past security breaches and events can be deemphasized if the garage operator registers with the security service and notifies the security service of their improvements in security. In one embodiment, different parking areas can be rated by the cloud services logic and the ratings can be provided back to the user. These ratings can be used to recommend better locations for parking. If the parking owners see that their ratings have fallen, the parking owners can emphasize or correct their security issues to receive a better rating.

Other types of tracking can also be used. For example, tracking can be used to generate reports/notifications that are produced and distributed to safety coordinating officers of specific locations (or vehicle owners), or to identify information that occurred before or after an accident or incident at a specific location such as a vehicle collision, vehicle theft of attempted theft, robbery, attempted robbery as well as panic situations during crimes. These alerts can also be provided with historical data associated with the alerts. The historical data can include images taken by cameras of the specific locations where the alerts occurred. The images can be videos, video clips, still images, collection of still images, audio files, audio snippets, that are accessible instantly over cloud processing 120.

This information can also be accessible via cloud processing 120 after a specific incident is reported. For example, if a burglary or crime occurred within the location, the sensor data of the location as well as the sensor data of the vehicles can be coordinated to identify when and who traversed specific locations within the area. In one embodiment, the collected data can be partitioned to allow certain data to be shared with the owner of the vehicle and certain data to be restricted to the owner or operator of the location.

The vehicle cameras can also be obtaining data during, after or before the vehicle begins to move. The vehicle cameras can be located in all locations around the vehicle. The vehicle cameras can be located in the front, in the rear, under the vehicle, above the vehicle, to the sides of the vehicles etc. Other sensors the vehicle can include ultrasonic sensors, heat sensors, IR sensors, sound sensors, gyroscopes, microphones, etc.

In some embodiments, the vehicles may establish peer-to-peer links to facilitate fast transfer of data. In other embodiments, vehicles may link to each other using pairing algorithms that allow the vehicles to exchange data using WiFi, Bluetooth, near field communication (NFC), or some other short range communication protocol.

Figure 10A:
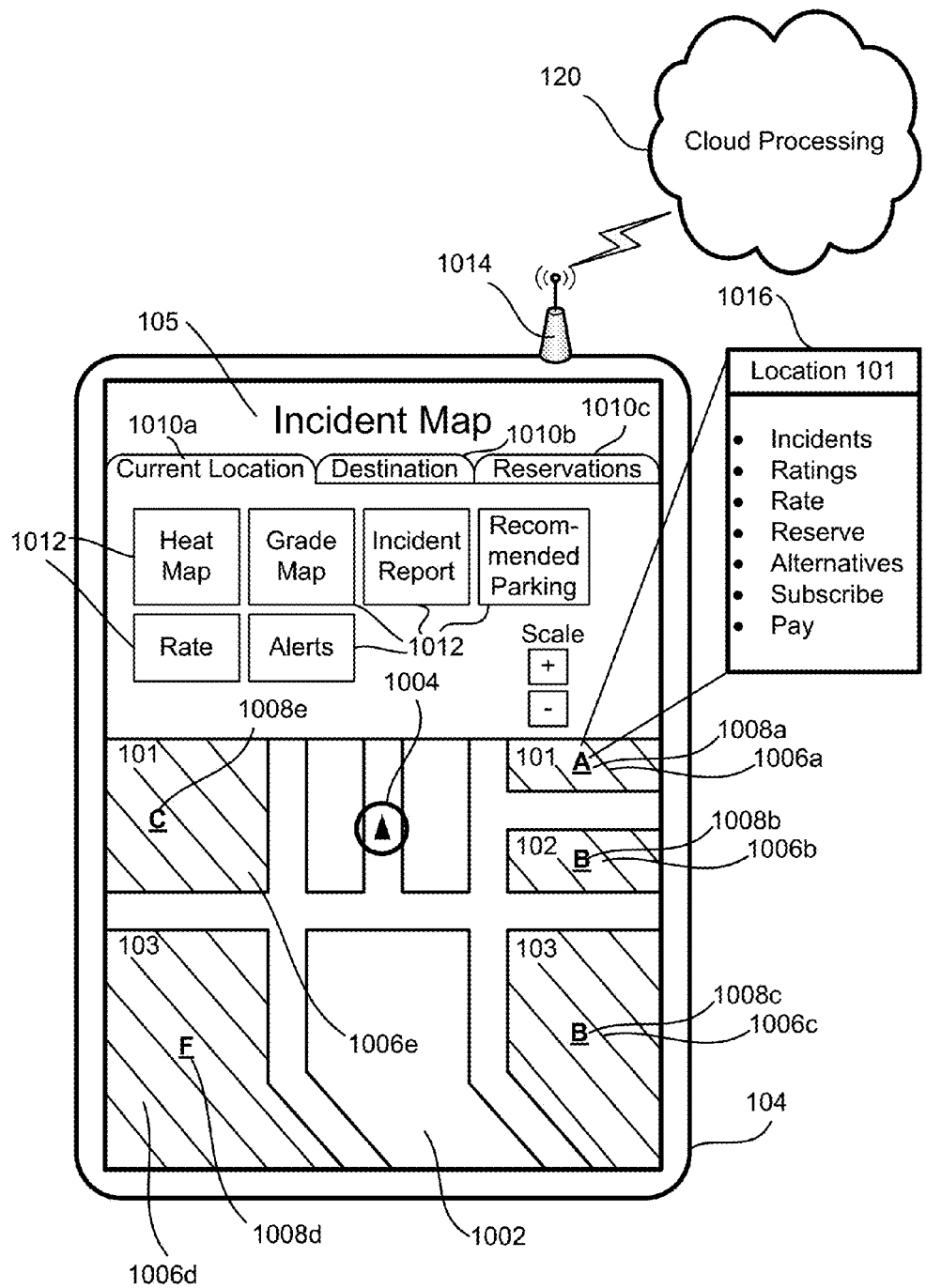
FIG. 10A illustrates an example mobile device displaying an example GUI of an APP useful for displaying, consuming, interpreting, selecting, notifying, controlling, managing and updating information related to a user's location, and/or their future location as it relates to parking location selection.

FIG. 10A illustrates an example mobile device 104 displaying an example GUI 105 of an APP useful for displaying, consuming, interpreting, selecting, notifying, controlling, managing and updating information related to a user's location, and/or their future location as it relates to parking location selection. The device 104 can use communications electronics 1014 to communicate with cloud processing 120 to exchange information useful for dynamically updating information displayed and interpreted in the APP's GUI 105. In this example, the user may require information useful for determining the safest place to park relative to their current location 1004 by selecting a screen that will display current location data 1010*a*.

The APP may use any combination of device electronics in coordination with GPS location coordinates to determine what types of overlays to display on the GUI 105 to show the user the different options he or she may have in parking. The user may choose from many different overlays on the given map 1002 showing the user's proximate location and parking options. In this case, the user may choose a grade map from selections 1012 which can also show information in heat map overlay mode, incident report overlay mode, recommended parking overlay mode, rating mode among others. In this particular example, a letter grade 1008*a-e* may be given to each available parking area 1006*a-e* within a proximate location of the users current location 1004. The letters grades illustrate one such way of indicating varying degrees of safety of certain locations, however, numbers, symbols, colors, as well as intensities or combinations of these may also be used to convey varying degrees of safety.

A user may also decide to view more information about a given parking area 106*a-e* and may be able to select an area by speaking to the app which will identify the selection, touching the screen to elect a choice, tap with an indicating utensil or speak a command. Once the user has made a selection, additional details may be displayed to the user pertaining to that particular parking area. This data may include metrics including but not limited to incidents, ratings, ability to rate, reservation options, alternatives, subscription options as well as payment options. A user may decide that a parking location A is close to where they need to be, however the location may have a high rate of incidents.

In one embodiment, the user may click on the incidents information tab to determine if the incidents were severe or mild to determine if the risk is worth parking closer to their destination. The user may want to subscribe to a given parking area 1006*a-e* in order to receive alerts when an incident happens to determine if the parking area is safe to park in at a later time or when they have parked in that area. After the user has parked in an area, the user may decide to rate the parking area, report an incident or pay for parking time.

Figure 10B:
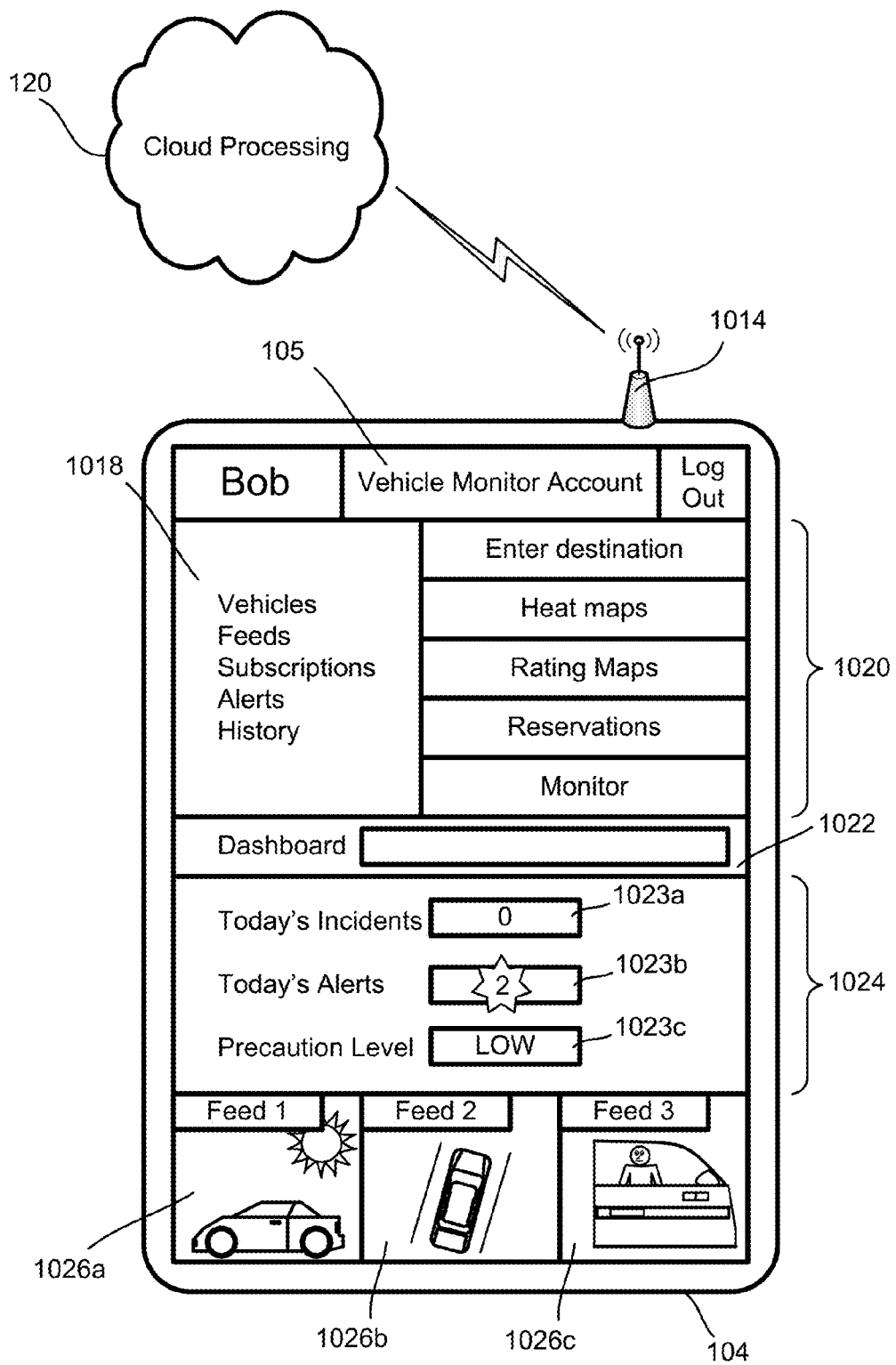
FIG. 10B shows one example of a configurable dynamically updating home-screen and or dashboard displayed on GUI for an APP running on device having communication electronics useful for exchanging data with cloud processing.

FIG. 10B shows one example of a configurable dynamically updating home-screen and or dashboard displayed on GUI 105 for an APP running on device 104 having communication electronics 1014 useful for exchanging data with cloud processing 120. This example home-screen may have different types of information arranged in a predetermined or custom fashion by the user to reflect the most important items to the user. For example, the user's name is displayed; in this case Bob, showing that they are viewing a main account page. This main account page, homepage and dashboard 1022 may have varying components. Once such component may be a navigation screen 1018 displaying frequently used utilities including but not limited to vehicle configuration, feeds, subscriptions, alerts, history among others. This screen may provide quick access to the most commonly used or the most frequently used data to enhance the user's experience while navigating the APP.

In one embodiment, the homepage may also contain a section dedicated to interactive utilities 1020 including but not limited to destination entry, heat maps and map overlays, rating maps, reservations utilities, monitors etc. The user may choose to enter their destination in which the user may want to receive information about available parking in and around that location along with information on varying safety levels associated with those parking areas. Similarly, the user may already be in the area where the user wishes to park, in such case, the user may choose a dynamic location based map overlay to help in deciding where the safest place to park is. The user may choose to reserve parking in advance or reserve parking when they are approaching an identified parking area on the map overlay interactive map utility.

A user's APP homepage may also include dynamically updating sections 1024 in which the most important information at a given time may be displayed or surfaced to a user. If a user has parked in a certain parking area, he or she may want to monitor metrics related to incidents that may have occurred to his or her vehicle, vehicles around his or her vehicle, any dynamically received alerts, as well as precaution levels. Additionally, a user may choose to configure his or her APP homepage to display the most pertinent audio and video feeds to their needs.

The example of the APP shows 3 such feeds: 1026*a* of a side view of a user's vehicle, 1026*b*, a bird's eye view of a user's vehicle and 1026*c*, a view from inside the user's vehicle looking out through the driver's window. This example shows 3 such feeds, however, any number of feeds may or may not be shown simultaneously, depending on the APP configuration by the user. These feeds may be useful in identifying threats to a user's vehicle why the user is away. For instance, feed 1026 shows the view from inside the vehicle looking out through the driver's window which has captured suspicious activity relating to an individual peering into the user's vehicle. Since all camera's feeds may be passed through a filtering algorithm to determine if activity is suspicious or benign, a determination can be made by the logic to alert the user or not. In this case, the logic has determined that the activity of an individual peering into the user's vehicle qualifies as suspicious.

Figure 10C:
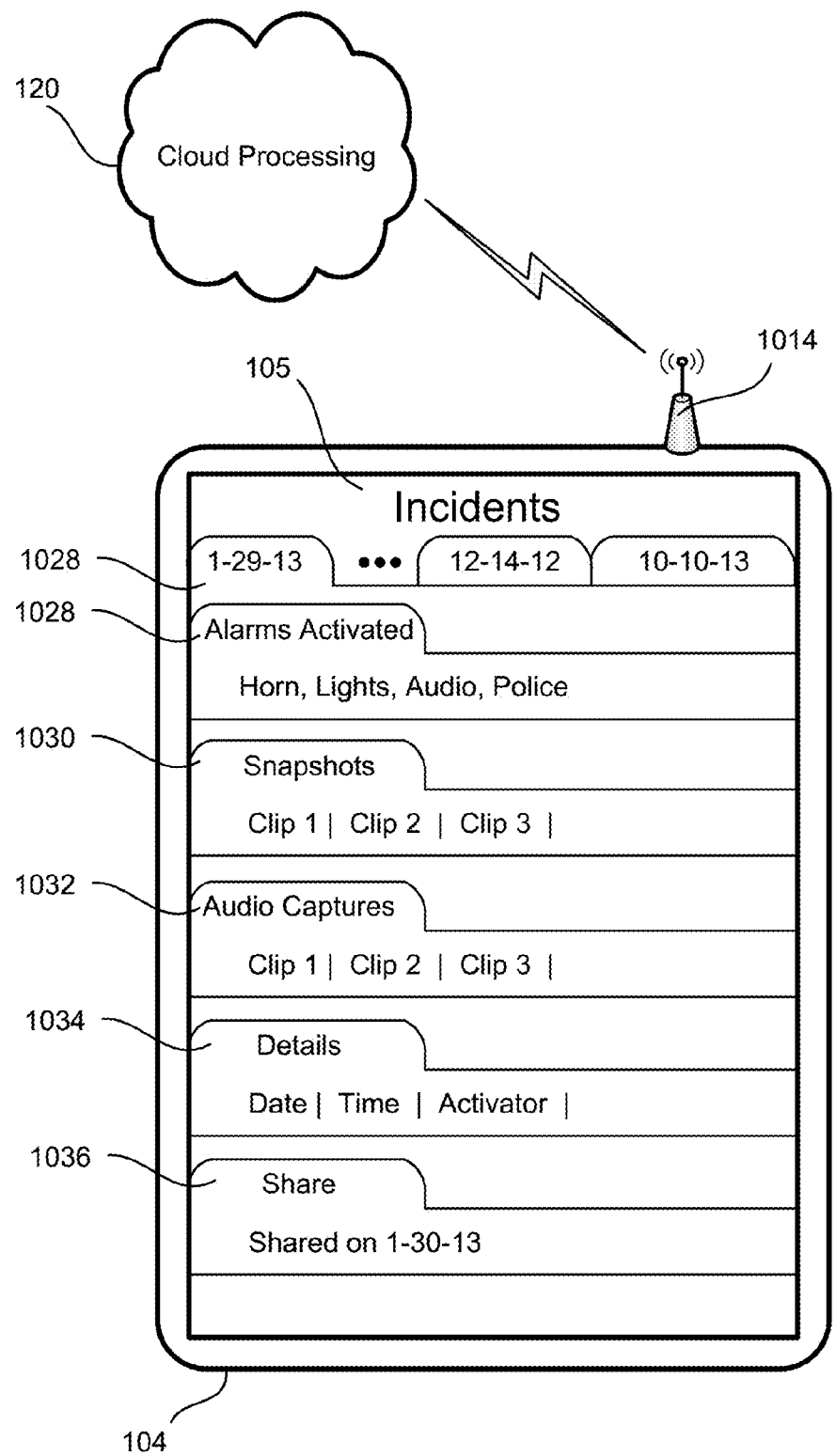
FIG. 10C shows one example of a GUI running on device updated via communication electronics by exchanging data with cloud processing related to displaying past and current incidents for a given user's vehicle(s).

FIG. 10C shows one example of a GUI 105 running on device 104 updated via communication electronics 1014 by exchanging data with cloud processing 120 related to displaying past and current incidents for a given user's vehicle (s). In this example, incidents are organized in tabs by date 1028 but may be organized in any fashion, numbering or representation in any sortable form to convey the amalgamation of incidents in time. In this case, incident 1028 pertains to an incident that occurred on the X day of July XXXX. Information pertaining to incident 1028 may be displayed including but not limited to the alarms that were activated in conjunction with the incident 1030, audio/video captures 1032, additional details, and options such as the ability to share 1036 the incident to aid in the crowdsourcing of data useful for rating, grading, trending and heat mapping of parking locations with the latest incident information.

Figure 10D:
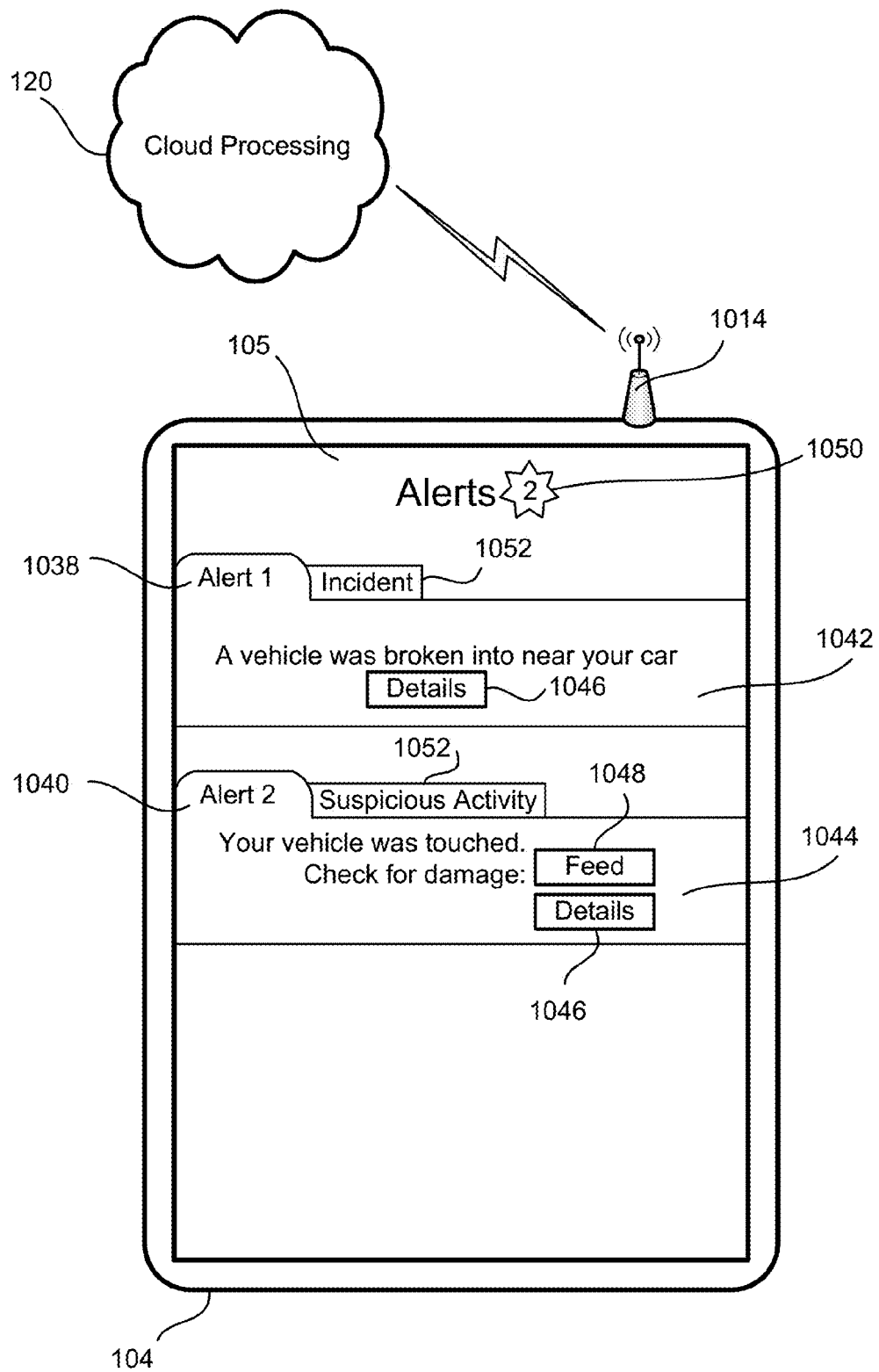
FIG. 10D shows one example of a GUI running on device updated via communication electronics by exchanging data with cloud processing.

FIG. 10D shows one example of a GUI 105 running on device 104 updated via communication electronics 1014 by exchanging data with cloud processing 120 related to displaying the latest alerts sent to a user dynamically regarding incidents involving the user's vehicle or vehicles proximate to the user's vehicle, or within the same parking area as the user's vehicle. One such alert 1038 may be further qualified by a description 1052. In this case, description 1052 shows the user that this alert is incident related.

In one embodiment, information regarding the incident or a brief summary of the incident 1042 may be shown to the user. In this case, the incident is regarding the break-in of a vehicle proximate to the user's vehicle. The user may also elect to consume all details related to alert 1038 by selecting the details button 1046 which will show all text and media available regarding alert 1038. This may be useful to the user by electing to move his or her vehicle to a safer location. A second example of an alert may be alert 1040 with description 1052 regarding suspicious activity. Details regarding this alert may be displayed in area 1044 in which the user's vehicle determined that it has been touched using gyroscopes. The user may elect for more details by choosing button 1046 or may want to watch live feeds from their vehicle by choosing button 1048 to validate the alert or determine if the alert was a false alarm.

Figure 10E:
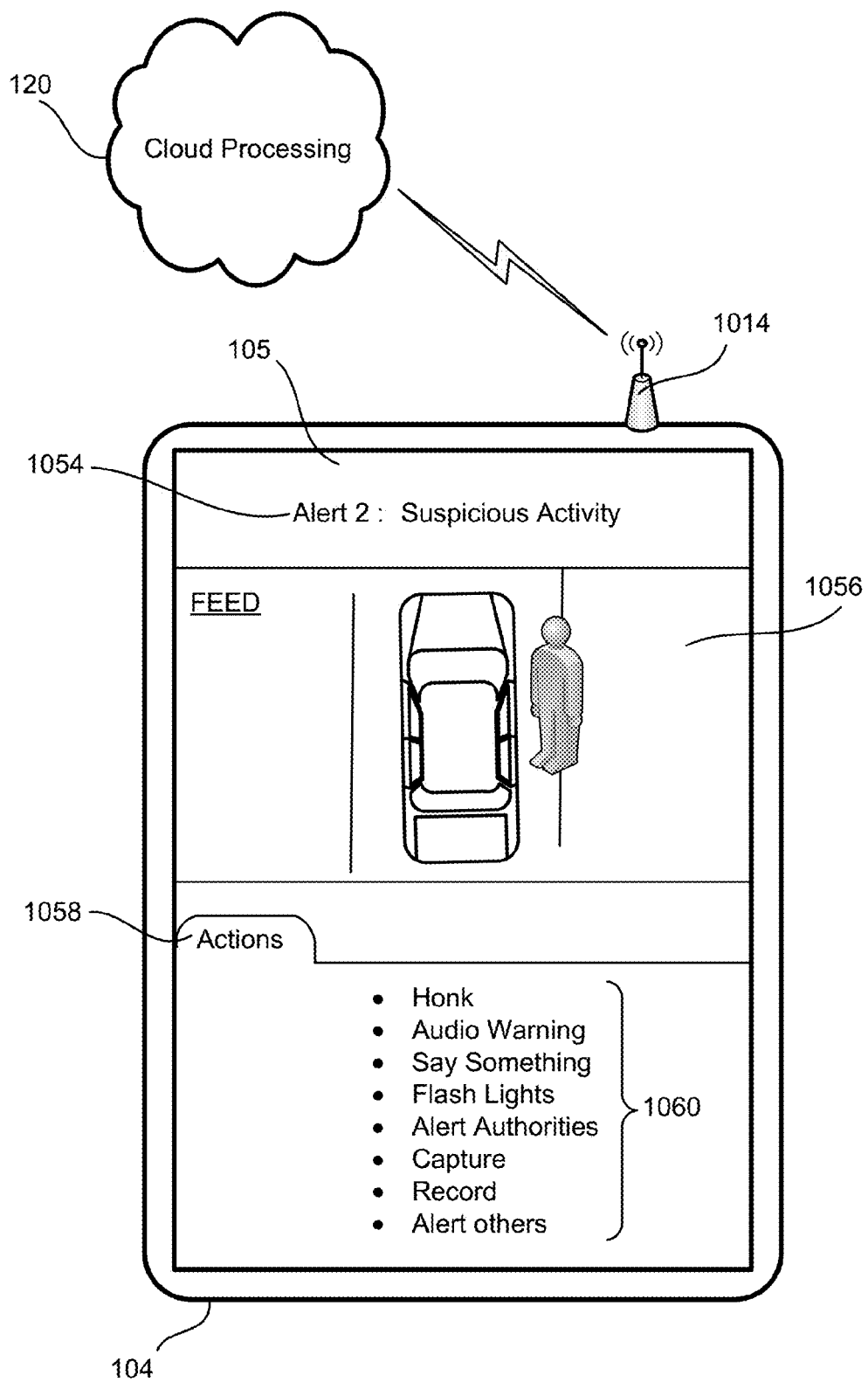
FIG. 10E shows one example of a GUI running on device updated via communication electronics by exchanging data with cloud processing related to displaying the latest alerts sent to a user dynamically regarding particular alert titled suspicious activity.

FIG. 10E shows one example of a GUI 105 running on device 104 updated via communication electronics 1014 by exchanging data with cloud processing 120 related to displaying the latest alerts sent to a user dynamically regarding particular alert 1054 titled suspicious activity. This GUI representation is one example of may form factors used to display such information. In this case, after a user receives an alert that their vehicle may have been touched, the user may elect to view a live feed of their vehicle and surroundings. In this case, the user may view that an individual is indeed suspicious and may be tampering with the user's vehicle by interpreting feed 1056.

At this time, the user may elect to enable varying degrees of countermeasures to deter the suspicious individual. Actions 1060 available to the user may include but are not limited to honking the vehicle's horn, providing an audio warning, speaking directly to the suspicious individual near the vehicle, flashing the vehicle's lights or lighting system, alert the authorities, capture snapshots of the suspicious individual, record all video and audio for storage locally on the device as well as cloud processing storage systems as well as electing to alert others in the area that may be affected by the suspicious activity. This alert may show up on another user's device 104 as an alert as it did on the current user's device.

Figure 10F:
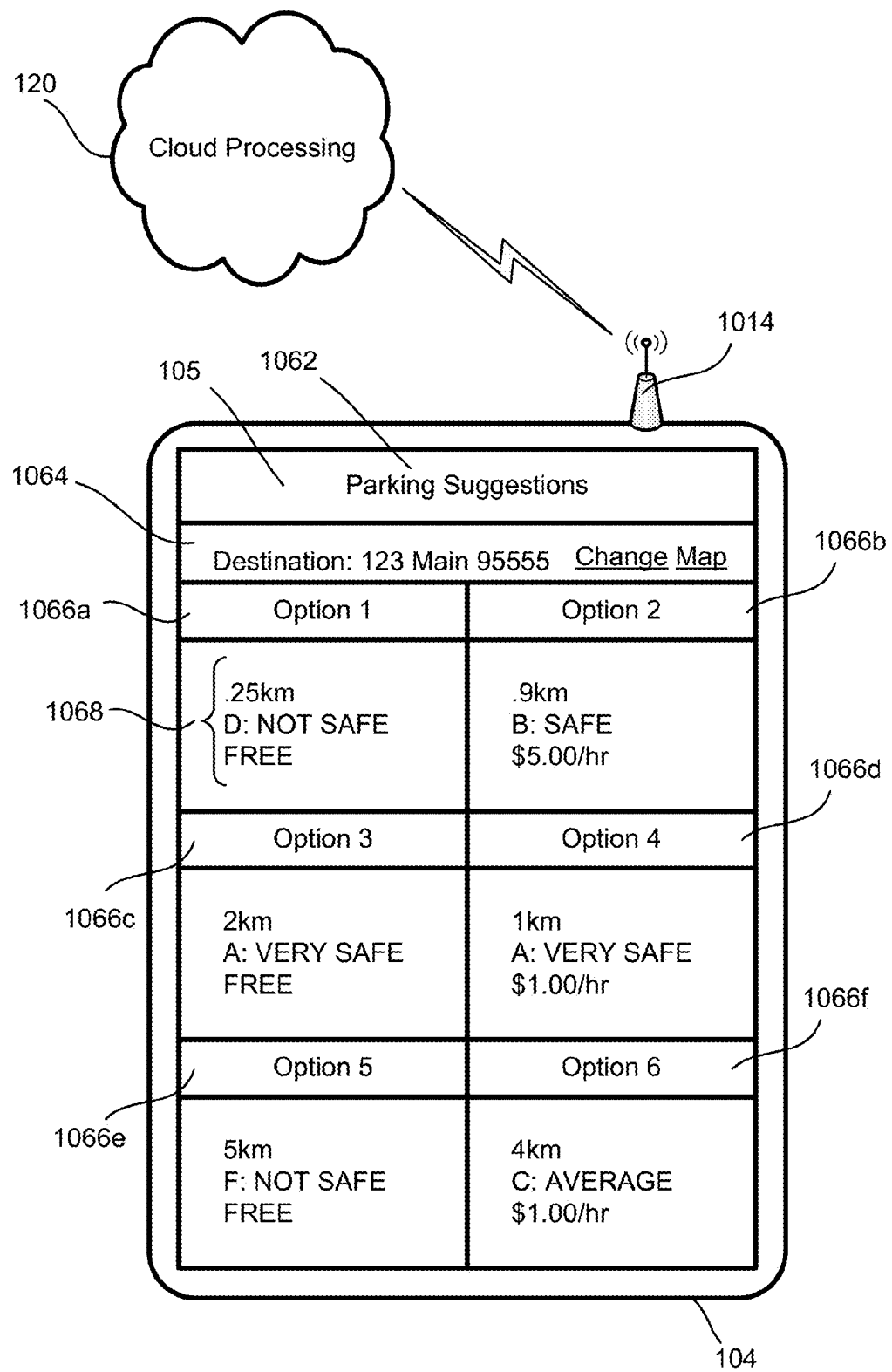
FIG. 10F shows one example of a GUI running on device updated via communication electronics by exchanging data with cloud processing.

FIG. 10F shows one example of a GUI 105 running on device 104 updated via communication electronics 1014 by exchanging data with cloud processing 120 related to displaying the available parking suggestions 1062 screen to a user that is proximate to available parking location or has elected to enter a destination 1064 and wishes to be displayed with the available parking locations in advance. In this example, the APP GUI 105 shows tiles in which varying parking locations are displayed 1066*a-f*. this options may be displayed in any fashion aside from tiles, such as locations on a map overlay, in list form or other method useful for conveying a plurality of parking options. Each parking option may contain a subset of data associated with that parking location 1068 describing the distance from the user's intended destination or current location, the safety rating displayed by letter grade, number system, symbols, colors intensities or any combination there of useful for the interpretation of safety levels. This subset of data may also include utilities such as displaying the current parking fees associated with each parking location if any.

In one embodiment, the vehicles can communicate directly with each other via a temporary pairing process. The temporary pairing process can be automatically enabled when vehicles become too close to each other, for example. When this happens, local communication between the vehicles, such as a peer-to-peer connection, Wi-Fi connection, NFC connection, or Bluetooth connection can be established to enable the vehicles to share information concerning their proximity to one another. This local communication will enable one or both vehicles to take correction actions or alert a driver to change course or trigger automatic collision prevention measures (e.g., more aggressive notifications to one or both operators, slow the speed of one or more vehicles, change the driving direction of one or more vehicles, etc.). Once the close proximity communication occurs and some corrective action is made, the data regarding the occurrence and the actions taken can be communicated to the cloud system for storage. The information can then be viewed by a registered user having access to an account for the vehicle(s).

In still other embodiments, based on data collected from events to triggers of alarms, the cloud processing system can suggest specific parking spots, slots, garages, areas, areas of cities, areas of buildings, neighborhoods, etc. In still other embodiments, the data obtained from reported triggers, security breaches, or elevated levels of security requested, the data can be augmented with data from authorities, such as crime statistics. These statistics can be obtained from online databases and combined or blended with data obtained from vehicle activities. The data can be obtained for different types of crime activity, such as car-jacking, muggings, theft, etc. The data can also be assigned to specific areas by GPS locations, by zip codes, by a radius around some object, location or vehicle.

In one embodiment, a user can remotely reserve a parking spot. The reserved parking spot can be tied to a particular rating of security. Spots in a parking garage, for example, can be reserved and paid for based on their demand. Spots with low crime or high safety ratings may lease for higher fees, while spots with a lower safety rating may lease for less money. The reservation can be made using a mobile device for remote reservation, or can be made by electronics of the vehicle. In one embodiment, as a vehicle arrives at a parking area, the user may be provided with options to park. The options can be tied to the security rating for the parking spots.

It will be obvious, however, to one skilled in the art, that the present invention may be practiced without some or all of these specific details. In other instances, well known process operations have not been described in detail in order not to unnecessarily obscure the present invention.

The various embodiments defined herein may define individual implementations or can define implementations that rely on combinations of one or more of the defined embodiments. Further, embodiments of the present invention may be practiced with various computer system configurations including hand-held devices, microprocessor systems, microprocessor-based or programmable consumer electronics, minicomputers, mainframe computers and the like. The invention can also be practiced in distributed computing environments where tasks are performed by remote processing devices that are linked through a wire-based or wireless network.

With the above embodiments in mind, it should be understood that the invention could employ various computer-implemented operations involving data stored in computer systems. These operations are those requiring physical manipulation of physical quantities. Usually, though not necessarily, these quantities take the form of electrical or magnetic signals capable of being stored, transferred, combined, compared and otherwise manipulated.

Any of the operations described herein that form part of the invention are useful machine operations. The invention also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

The invention can also be embodied as computer readable code on a computer readable medium. The computer readable medium is any data storage device that can store data, which can thereafter be read by a computer system. The computer readable medium can also be distributed over a network-coupled computer system so that the computer readable code is stored and executed in a distributed fashion.

Although the foregoing invention has been described in some detail for purposes of clarity of understanding, it will be apparent that certain changes and modifications can be practiced within the scope of the appended claims. Accordingly, the present embodiments are to be considered as illustrative and not restrictive, and the invention is not to be limited to the details given herein, but may be modified within the scope and equivalents of the appended claims.

The invention claimed is:

1. A method, executed by a processor, managing security of a vehicle having electronics for managing the vehicle and for communicating wirelessly with the Internet, comprising:
   recording a zone proximate to the vehicle using at least one of an audio, visual, or motion sensor;
   receiving one or more requests at the vehicle from a wireless device handled by a user of the vehicle; and
   illuminating an area proximate to the vehicle with lighting upon receiving a first request, the illuminating being color coded to be indicative of a safety level for approaching said vehicle by said user, the safety level associated with the vehicle based on unauthorized events that were detected of persons at the vehicle or within the proximity zone of the vehicle during a time before receiving the first request at the vehicle, the first request being to open or access the vehicle.

2. The method of claim 1, further including,
   initiating video recording proximate to the vehicle upon receiving one or more requests after the first request;
   transmitting, over the Internet, a notification to a predetermined recipient, the notification including at least part of the video recording; and
   wherein the notification and the at least part of the video recording are saved at a remote server connected to the Internet in association with an account of the user for the vehicle.

3. The method of claim 1, further comprising,
   providing a changed lighting after receiving a second request, the changed lighting is intensified lighting with a color or different color lighting.

4. The method of claim 1, wherein a second request triggers elevated audible outputs from the vehicle, the audio outputs include sounds and/or voice language warnings.

5. The method of claim 1, wherein the area proximate to the vehicle that is illuminated is viable from a distance to notify the safety level, wherein the color coding is used to signify one or more predefined safety levels, wherein each predefined safety level is associated with a predefined color.

* * * * *